(12) United States Patent
Tsukamoto

(10) Patent No.: US 7,276,842 B2
(45) Date of Patent: Oct. 2, 2007

(54) ELECTRON-EMITTING DEVICE, ELECTRON SOURCE AND IMAGE-FORMING APPARATUS, AND METHOD FOR MANUFACTURING ELECTRON EMITTING DEVICE

(75) Inventor: Takeo Tsukamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/286,436

(22) Filed: Nov. 25, 2005

(65) Prior Publication Data

US 2006/0082277 A1    Apr. 20, 2006

Related U.S. Application Data

(62) Division of application No. 09/941,595, filed on Aug. 30, 2001, now Pat. No. 7,034,444.

(30) Foreign Application Priority Data

Sep. 1, 2000   (JP) .............................. 2000-265824
Aug. 24, 2001  (JP) .............................. 2001-254637

(51) Int. Cl.
    *H01J 1/02* (2006.01)
(52) U.S. Cl. ...................... 313/309; 313/310; 313/336; 313/351; 313/495
(58) Field of Classification Search ........ 313/309–311, 313/495
    See application file for complete search history.

(56) References Cited

U.S. PATENT DOCUMENTS

| | | | |
|---|---|---|---|
| 4,728,851 A | 3/1988 | Lambe | 313/309 |
| 4,816,289 A | 3/1989 | Komatsu et al. | 423/447.3 |
| 4,900,483 A | 2/1990 | Witzke et al. | 313/309 |
| 4,904,895 A | 2/1990 | Tsukamoto et al. | 313/336 |
| 4,956,578 A | 9/1990 | Shimizu et al. | 315/3 |
| 5,066,883 A | 11/1991 | Yoshioka et al. | 313/309 |
| 5,185,554 A | 2/1993 | Nomura et al. | 313/495 |
| 5,192,240 A | 3/1993 | Komatsu | 445/24 |
| 5,214,346 A | 5/1993 | Komatsu | 313/309 |
| 5,382,867 A | 1/1995 | Maruo et al. | 313/309 |

(Continued)

FOREIGN PATENT DOCUMENTS

CN        1181607 A      5/1998

(Continued)

OTHER PUBLICATIONS

C.A. Spindt et al., *Physical Properties of thin-Film Field Emission Cathodes with Molybdenum Cones*, Journal of Applied Physics, vol. 47, No. 12 (1976) pp. 5248-5263.

(Continued)

*Primary Examiner*—Vip Patel
(74) *Attorney, Agent, or Firm*—Fitzpatrick, Cella, Harper & Scinto

(57) ABSTRACT

To provide an electron-emitting device, an electron source, an image-forming apparatus, and a method for manufacturing the electron-emitting device whereby it is possible to reduce a device capacity and a driving voltage, to improve the efficiency of emitting electrons, and to obtain high-resolution beam. The extracting electrode and the cathode electrode are provided on an insulating substrate, a layer having growth selectivity of fibrous carbon is formed on the cathode electrode, and the fibrous carbon is grown via catalyst particles formed on the layer.

20 Claims, 13 Drawing Sheets

U.S. PATENT DOCUMENTS

| | | | |
|---|---|---|---|
| 5,443,859 A | 8/1995 | Nagata | 427/122 |
| 5,458,784 A | 10/1995 | Baker et al. | 210/674 |
| 5,500,200 A | 3/1996 | Mandeville et al. | 423/447.3 |
| 5,543,684 A | 8/1996 | Kumar et al. | 313/495 |
| 5,551,903 A | 9/1996 | Kumar et al. | 445/24 |
| 5,577,943 A | 11/1996 | Vickers et al. | 445/24 |
| 5,612,587 A | 3/1997 | Itoh et al. | 313/309 |
| 5,618,875 A | 4/1997 | Baker et al. | 524/495 |
| 5,690,997 A | 11/1997 | Grow | 427/249.1 |
| 5,726,524 A | 3/1998 | Debe | 313/309 |
| 5,770,918 A | 6/1998 | Kawate et al. | 313/495 |
| 5,773,921 A | 6/1998 | Keesmann et al. | 313/309 |
| 5,847,495 A | 12/1998 | Yamanobe et al. | 313/310 |
| 5,872,422 A | 2/1999 | Xu et al. | 313/311 |
| 5,872,541 A | 2/1999 | Yoshioka et al. | 345/74.1 |
| 5,935,639 A | 8/1999 | Sullivan et al. | 427/78 |
| 5,965,267 A | 10/1999 | Nolan et al. | 428/408 |
| 5,973,444 A | 10/1999 | Xu et al. | 313/309 |
| 5,981,305 A | 11/1999 | Hattori | 438/20 |
| 5,982,091 A | 11/1999 | Konishi | 313/495 |
| 5,986,389 A | 11/1999 | Tsukamoto | 313/309 |
| 6,087,765 A | 7/2000 | Coll et al. | 313/309 |
| 6,129,602 A | 10/2000 | Yamanobe | 445/24 |
| 6,135,839 A | 10/2000 | Iwase et al. | 445/24 |
| 6,147,449 A | 11/2000 | Iwasaki et al. | 313/495 |
| 6,171,162 B1 | 1/2001 | Iwasaki et al. | 445/6 |
| 6,184,610 B1 | 2/2001 | Shibata et al. | 313/309 |
| 6,204,597 B1 | 3/2001 | Xie et al. | 313/310 |
| 6,228,904 B1 | 5/2001 | Yadav et al. | 523/210 |
| 6,231,413 B1 | 5/2001 | Tsukamoto | 445/24 |
| 6,246,168 B1 | 6/2001 | Kishi et al. | 313/495 |
| 6,283,812 B1 | 9/2001 | Jin et al. | 445/24 |
| 6,288,494 B1 | 9/2001 | Tsukamoto et al. | 315/169.1 |
| 6,290,564 B1 | 9/2001 | Talin et al. | 445/24 |
| 6,313,572 B1 | 11/2001 | Yamada | 313/310 |
| 6,331,690 B1 | 12/2001 | Yudasaka et al. | 219/121.6 |
| 6,333,016 B1 | 12/2001 | Resasco et al. | 423/447.3 |
| 6,390,612 B1 | 5/2002 | Kotaki et al. | 347/85 |
| 6,400,091 B1 | 6/2002 | Deguchi et al. | 315/169.1 |
| 6,413,487 B1 | 7/2002 | Resasco et al. | 423/447.3 |
| 6,445,006 B1 | 9/2002 | Brandes et al. | 257/76 |
| 6,448,709 B1 | 9/2002 | Chuang et al. | 313/497 |
| 6,455,021 B1 | 9/2002 | Saito | 423/447.3 |
| 6,471,936 B1 | 10/2002 | Chen et al. | 423/658.2 |
| 6,472,814 B1 | 10/2002 | Yamanobe et al. | 313/495 |
| 6,626,719 B2 | 9/2003 | Ono et al. | 445/24 |
| 6,628,053 B1 | 9/2003 | Den et al. | 313/310 |
| 6,848,962 B2 | 2/2005 | Kitamura et al. | 445/24 |
| 6,853,126 B2 | 2/2005 | Nomura | 313/492 |
| 6,858,990 B2 | 2/2005 | Tsukamoto | 315/169.1 |
| 6,948,995 B2 | 9/2005 | Ishikura et al. | 445/51 |
| 7,012,362 B2 * | 3/2006 | Kawate et al. | 313/495 |
| 2001/0006232 A1 | 7/2001 | Choi et al. | 257/10 |
| 2002/0009637 A1 | 1/2002 | Murakami et al. | 429/213 |
| 2002/0031972 A1 | 3/2002 | Kitamura et al. | 445/3 |
| 2002/0047562 A1 | 4/2002 | Kitamura et al. | 315/169.3 |
| 2002/0060516 A1 | 5/2002 | Kawate et al. | 313/309 |
| 2002/0074947 A1 | 6/2002 | Tsuukamoto | 315/169.3 |
| 2002/0136896 A1 | 9/2002 | Takikawa et al. | 428/408 |
| 2002/0146958 A1 | 10/2002 | Ono et al. | 445/24 |
| 2003/0006684 A1 | 1/2003 | Shinichi et al. | 313/311 |
| 2003/0048056 A1 | 3/2003 | Kitamura et al. | 313/311 |
| 2003/0222560 A1 | 12/2003 | Roach | 313/311 |
| 2004/0012327 A1 * | 1/2004 | Shiratori et al. | 313/497 |

FOREIGN PATENT DOCUMENTS

| | | |
|---|---|---|
| EP | 0 290 026 A1 | 11/1988 |
| EP | 0 394 698 A2 | 10/1990 |
| EP | 0 433 507 A1 | 6/1991 |
| EP | A1 443 865 | 8/1991 |
| EP | 0 290 026 B1 | 2/1993 |
| EP | 0 535 953 A2 | 4/1993 |
| EP | 0 614 209 A1 | 9/1994 |
| EP | 0 535 953 B1 | 1/1996 |
| EP | 0 716 439 A1 | 6/1996 |
| EP | 0 758 028 A2 | 2/1997 |
| EP | 0 797 233 A2 | 9/1997 |
| EP | 0 836 217 A1 | 4/1998 |
| EP | A1 871 195 | 10/1998 |
| EP | 0 913 508 A3 | 5/1999 |
| EP | 913508 A2 | 5/1999 |
| EP | 0 936 650 A1 | 8/1999 |
| EP | A1 936 650 | 8/1999 |
| EP | 0 980 089 A1 | 2/2000 |
| EP | 0 451 208 B1 | 3/2000 |
| EP | 0 986 084 A2 | 3/2000 |
| EP | 1 022 763 A1 | 7/2000 |
| EP | 1 096 533 A1 | 5/2001 |
| EP | 1 102 299 A1 | 5/2001 |
| EP | 1 113 478 A1 | 7/2001 |
| EP | 1 117 118 A1 | 7/2001 |
| EP | 1 120 877 A1 | 8/2001 |
| EP | 1 122 344 A2 | 8/2001 |
| EP | 1 187 161 A2 | 3/2002 |
| EP | 0 758 028 B1 | 9/2002 |
| GB | 2 308 495 A | 6/1997 |
| JP | 1-309242 | 12/1989 |
| JP | 2-112125 | 4/1990 |
| JP | 3-20941 | 1/1991 |
| JP | 03-260119 | 11/1991 |
| JP | 03-295131 | 12/1991 |
| JP | 04-212236 | 3/1992 |
| JP | 05-159696 | 6/1993 |
| JP | 05-198253 | 8/1993 |
| JP | 5-211029 | 8/1993 |
| JP | 05-274997 | 10/1993 |
| JP | 7-6714 | 1/1995 |
| JP | 08-100328 | 4/1996 |
| JP | 8-115652 | 5/1996 |
| JP | 08-115652 | 5/1996 |
| JP | 8-264109 | 10/1996 |
| JP | 08-298068 | 11/1996 |
| JP | 9-82214 | 3/1997 |
| JP | 09-188600 | 7/1997 |
| JP | 9-237565 | 9/1997 |
| JP | 10-289650 | 10/1998 |
| JP | 11-139815 | 5/1999 |
| JP | 11-162334 | 6/1999 |
| JP | 11-194134 | 7/1999 |
| JP | 11-232997 | 8/1999 |
| JP | 2000-57934 | 2/2000 |
| JP | 2000-86216 | 3/2000 |
| JP | 2000-90809 | 3/2000 |
| JP | 2000-95509 | 4/2000 |
| JP | 2000-191302 | 7/2000 |
| JP | 2000-208028 | 7/2000 |
| JP | 2000-223005 | 8/2000 |
| JP | 2000-277003 | 10/2000 |
| JP | 2001-52598 | 2/2001 |
| JP | 2001-162600 | 6/2001 |
| JP | 2001-288625 A | 10/2001 |
| WO | WO89/07163 | 8/1989 |
| WO | WO90/07023 | 6/1990 |
| WO | WO98/05920 | 2/1998 |
| WO | WO99/58748 | 11/1999 |
| WO | WO 01/26130 | 4/2001 |
| WO | WO 01/93292 A1 | 12/2001 |

OTHER PUBLICATIONS

R.T.K. Baker et al., "Formation of Carbonaceous Deposits from the Platinum-Iron Catalyzed Decomposition of Acyetylene," 37 J. Catal. 101-105 (1975).

R.T.K. Baker, "Catalytic Growth of Carbon Filaments," 27 (3) Carbon 315-323 (1989).

S. Iijima, "Helical Microtubules of Graphitic Carbon," Nature, vol. 345, 56-58 (1991).

T. W. Ebbesen et al., "Large-Scale Synthesis of Carbon Nanotubes," Nature, vol. 358, 220-222 (1992).

W. A. DeHeer et al., "Aligned Carbon Nanotube Films: Production and Optical and Electronic Properties," Science vol. 268, 845-847 (1995).

T. Guo et al., "Catalytic Growth of Single- Walled Nanotubes by Laser Vaporization," Chem Phys. Lett., vol. 243, 49-54 (1995).

A. G. Rinzler et al., "Unraveling Nanotubes: Field Emission from an Atomic Wire," Science, vol. 269, 1550-1553 (1995).

W. A. DeHeer et al., "A Carbon Nanotube Field-Emission Electron Source," Science, vol. 270, 1179-1180 (1995).

T. Kyotani et al., "Preparation of Ultrafine Carbon Tubes in Nanochannels of an Anodic Aluminum Oxide Film," Chem. Mater., vol. 8, 2109-2113 (1996).

A. Thess et al., "Crystalline Ropes of Metallic Carbon Nanotubes," Science, vol. 273 483-487 (1996).

H. Dai et al., "Single-Wall Nanotubes Produced by Metal-Catalyzed Disproportionation of Carbon Monoxide," Chem. Phys. Lett., vol. 260, 471-475 (1996).

H. Dai et al., "Nanotubes as Nanoprobes in Scanning Probe Microscopy," Nature, vol. 384, 147-150 (1996).

A. C. Dillon et al., "Storage of Hydrogen in Single- Walled Carbon Nanotubes," Nature, vol. 386, 377-379 (1997).

W.P. Dyke et al., "Field Emission", *Advances in Electronics and Electron Physics*, vol. 8, (1956) pp. 89-185.

C.A. Mead, "Operation of Tunnel-Emission Devices", *Journal of Applied Physics*, vol. 32, No. 4, (1961), pp. 646-652.

Toshiaki Kusunoki et al., "Fluctuation-Free Electron Emission from Non-Formed Metal-Insulator-Metal (MIM) Cathodes Fabricated by Low Current Anodic Oxidation", *Japanese Journal of Applied Physics*, vol. 32 No. 11B, (1993), p. L1695-1697.

M.I. Elinson et al., "The Emission of Hot Electrons and the Field Emission of Electrons from Tin Oxide", *Radio Engineering and Electronic Physics*, (1965) pp. 1290-1296.

G. Dittmer, "Electrical Conduction and Electron Emission of Discontinuous Thin Films", *Thin Solid Films*, vol. 9, (1972) pp. 317-329.

M. Hartwell et al., "Strong Electron Emission from Patterned Tin-Indium Oxide Thin Films", IEEE Trans. Ed. Conf., (1983) pp. 519-521.

Hisashi Araki et al., Electroforming and Electron Emission of Carbon Thin Films, Journal of the Vacuum Society of Japan, 1983 (with English Abstract on p. 22).

Rodriguez et al., "Catalytic Engineering of Carbon Nanostructures," Langmuir 11, 3862-3866 (1995).

W. Zhu Et Al., *Electron Field Emission From Nanostructured Diamond and Carbon Nanotubes*, Solid State Electronics, vol. 45, 2001, pp. 921-928.

J.M. Bonard Et Al., *Field Emission From Carbon Nanotubes: The First Five Years*, Solid State Electronics, vol. 45, 2001, pp. 893-914.

A.M. Rao et al., "In Situ-grown Carbon Nanotube Array of with Excellent Field Emission Characteristics," Applied Physics Letter, vol. 76, No. 25, pp. 3813-3815 (2000).

Cheol Jin Lee et al., "Carbon Nanofibers Grown on Sodalime Glass at 500° C. Using Thermal Chemical Vapor Deposition," Chemical Physics Letters 340, pp. 413-418 (2001).

Sashiro Uemura et al., "Carbon Nanotube FED with Graphite-Nano-Fiber Emitters," ISSN 1083-1312, pp. 398-401.

Q. H. Wang et al., "A Nanotube-Based Field-Emission Flat Panel Display," Applied Physics Letters, vol. 72, No. 22, Jun. 1998, pp. 2912-2913.

* cited by examiner

ELECTRON-EMITTING DEVICE, ELECTRON SOURCE AND IMAGE-FORMING APPARATUS, AND METHOD FOR MANUFACTURING ELECTRON EMITTING DEVICE

This application is a division of U.S. application Ser. No. 09/941,595, filed Aug. 30, 2001 now U.S. Pat. No. 7,034,444.

BACKGROUND OF THE INVENTION

1. Field of the Invention

The present invention relates to an electron-emitting device, an electron source having the electron emitting device, and an image-forming apparatus for using and applying the electron source, and to a display apparatus for broadcast on television, a display apparatus for a TV conference system, a computer, and so on, and an image-forming apparatus used as an optical printer, which is composed of a photosensitive drum and the like. The present invention further relates to a method for manufacturing an electron-emitting device.

2. Related Background Art

Development of an image-forming apparatus using an electron-emitting device has been pursued in recent years.

A field emission (FE type) electron-emitting device has become a focus of attention as one of cold electron sources. The field emission electron-emitting device applies a strong electric field of $10^6$ V/cm or more on metal and emits an electron from a metal surface.

If a cold electron source of FE type is put into practical use, a low-profile emissive type image display apparatus can be achieved, thereby saving power consumption with light weight.

As an example of an vertical type FE, FIG. 13 shows an emitter 135 formed into a circular cone or a quadrangular pyramid in substantially a perpendicular direction from a substrate 131. For example, an vertical type FE has been known, which is (hereinafter, referred to as a spint type) in C. A. Spindt, "Physical Properties of thin-film field emission cathodes with molybdenium cones", J. Appl. Phys., 47,5248 (1967) and so on.

Meanwhile, FIG. 14 shows the configuration of a lateral type FE. Besides, in FIG. 14, reference numeral 141 denotes a substrate, reference numeral 142 denotes an emitter electrode, reference numeral 143 denotes an insulating layer, reference numeral 145 denotes an emitter, reference numeral 146 denotes an anode, and reference numeral 147 denotes the shape of an electron beam emitted to the anode. The emitter 145 having a pointed end and a gate electrode 144 are disposed in parallel on the substrate, and a collector (anode electrode) is formed above the substrate having the gate electrode and the emitter electrode thereon (refer to U.S. Pat. No. 4,728,851, U.S. Pat. No. 4,904,895 and the like).

Further, as an example of an electron-emitting device using fibrous carbon, Japanese Patent Application Laid-Open No. 8-115652 discloses the configuration in which thermal decomposition is performed on a fine catalyst metal by using organic compound gas to deposit fibrous carbon in a fine gap.

As a conductive layer for a carbon nanotube, Japanese Patent Application Laid-Open No. 11-194134 and EP0913508A2 disclose a metal layer made of titanium (Ti), zirconium (Zr), niobium (Nb), tantalum (Ta), molybdenum (Mo). Moreover, Japanese Patent Application Laid-Open No. 11-139815 discloses that Si is used as a conductive substrate.

In a conventional image-forming apparatus using an FE electron source, an electron beam spot (hereinafter, referred to as a beam diameter) is obtained according to a distance H between an electron source and phosphor and a driving voltage Vf of an anode voltage Va and an element. The beam diameter is about a submillimeter and its resolution has been sufficient for an image-forming apparatus.

However, as for an image-forming apparatus, a higher resolution has been demanded in recent years.

Furthermore, as the number of display pixels increases, power consumption rises due to a device capacity of an electron-emitting device when driving. Thus, a reduced device capacity, a reduced driving voltage, and an increased electron emission efficiency of an electron-emitting device have been demanded.

SUMMARY OF THE INVENTION

Such a related art has the following problems.

Since the above-mentioned spint type is configured such that the gate is laminated on the substrate, a parasitic capacity is formed between a large gate capacity and a number of emitters. Further, the spint type has a high driving voltage of several tens volts and a capacitive power consumption is large. Moreover, a beam spreads at an anode.

Although the horizontal FE can reduce a capacity of an element, a voltage of several hundreds of volts is required for driving because of a large distance between the emitter and the gate, resulting in a large driving device. Further, a beam spreads at the anode.

Although beam focusing means may be provided on the spint-type and lateral FE electron-emitting device, problems arise such as a complicated manufacturing scheme, an increased device area, and a reduced electron-emission efficiency.

The present invention is devised to solve the above problems. The object is to provide an electron-emitting device, an electron source, an image-forming apparatus, and a scheme of manufacturing an electron-emitting device that can reduce an device capacity and a driving voltage, improve the electron emission efficiency, and obtain a high-resolution beam.

An electron-emitting device of the present invention devised to attain the above object includes fiber comprising carbon as a main ingredient, a layer made of oxide of a material selected from Ti, Zr, Nb, and Al or a layer composed of an oxide semiconductor made of a material selected from Ti, Zr, and Nb. The fiber comprising carbon as a main ingredient is disposed on the layer and has Pd partially therein.

Further, the electron-emitting device of the present invention that is devised to attain the above-mentioned object includes first and second electrodes disposed with an interval on a substrate surface, a plurality of fibers that is electrically connected to the first electrode and comprising carbon as a main ingredient, and means for applying a potential higher than the first electrode to the second electrode, characterized in that the ends of the plurality of fibers, which comprising carbon as a main ingredient, are higher than the surface of the second electrode from the substrate surface, and a layer made of oxide composed of a material selected from Ti, Zr, Nb, and Al or a layer made of oxide semiconductor composed of a material selected from Ti, Zr, and Nb is disposed between the first electrode and the plurality of fibers comprising carbon as a main ingredient.

Moreover, the electron-emitting device of the present invention that is devised to attain the above-mentioned object includes a fiber comprising carbon as a main ingredient, and a layer made of oxide composed of a material selected from Ti, Zr, Nb, and Al or a layer made of oxide semiconductor composed of a material selected from Ti, Zr, and Nb, and the fiber comprising carbon as a main ingredient is disposed on the layer, and the fiber comprising carbon as a main ingredient has a plurality of layered graphenes.

Also, a method for manufacturing the electron-emitting device including fiber comprising carbon as a main ingredient that is devised to attain the above-mentioned object includes a step of disposing on a substrate a layer made of oxide composed of a material selected from Ti, Zr, Nb, and Al or a layer made of oxide semiconductor composed of a material selected from Ti, Zr, and Nb; a step of disposing catalyst particles on the layer; and a step of heating the substrate having the catalyst particles thereon in an atmosphere containing a carbon compound.

Furthermore, the present invention is characterized by an electron source using the above electron-emitting device and the image-forming apparatus. Besides, the present invention is characterized by an electron source using a method for manufacturing the above electron-emitting device and a method for manufacturing the image-forming apparatus.

According to the present invention, fiber comprising carbon as a main ingredient is provided on the layer containing a material having growth selectivity. Thus, the fiber comprising carbon as a main ingredient can obtain stable electrical connection and an electron-emitting device having excellent characteristics can be formed with a simple process.

DETAILED DESCRIPTION OF THE PREFERRED EMBODIMENTS

Referring to figures, the following will discuss the detail of the preferred embodiments of the present invention. However, regarding the dimensions, materials, shapes, and relative positions of members described in the embodiments, the present invention is not limited unless otherwise specified.

The inventor studied a material which forms a fine (on the order of several nm) nuclear (catalyst particle) by using a catalyst and makes electrical connection in stable manner with fibrous carbon growing from the nuclear by pyrolysis.

As a result, the inventor found that a material which allows a fibrous carbon to grow via a catalyst and provides an electrical connection is Ti, Zr, Nb, And Al, and that a partially (an interface making contact with the fibrous carbon or catalyst) oxidized material or an oxide semiconductor of Ti, Zr, and Nb can be suitably used.

And then, as a result of another detailed study, the inventor found that fibrous carbon can be generated at a position having a catalyst particle with good reproducibility by using a member having a catalyst particle (particularly Pd) on an oxide of a material selected from Ti, Zr, and Al.

Further, the inventor simultaneously found that a material not allowing fibrous carbon to grow or a material growing slowly is the same kind of material as Ta, Cr, Ag, Pt and a catalyst material.

Growth of the fibrous carbon on these materials is allowed on a layered structure as well. For example, Cr is entirely formed on a substrate, a small area of titanium oxide is formed thereon, and the surface of the substrate is entirely coated with palladium oxide. Fibrous carbon is selectively formed only on titanium oxide.

The following will discuss an electron-emitting device, an electron source, and an image-forming apparatus of the present invention that use the above-mentioned technique for forming fibrous carbon at a predetermined position with good reproducibility in comparison with the related art.

In general, an operating voltage Vf of an FE device is determined by an electric field at the end of an emitter and a current density of electron emission current. The electric field is derived by Poisson equation and the current density is computed by a relationship equation referred to as Fowler-Nordheim equation while a work function of the electric field and the emitter is used as a parameter.

Further, an electric field which can serve for electron emission becomes larger as a distance d between the end of the emitter and a gate electrode is smaller or a radius r of the end of the emitter is smaller.

Figure 13:
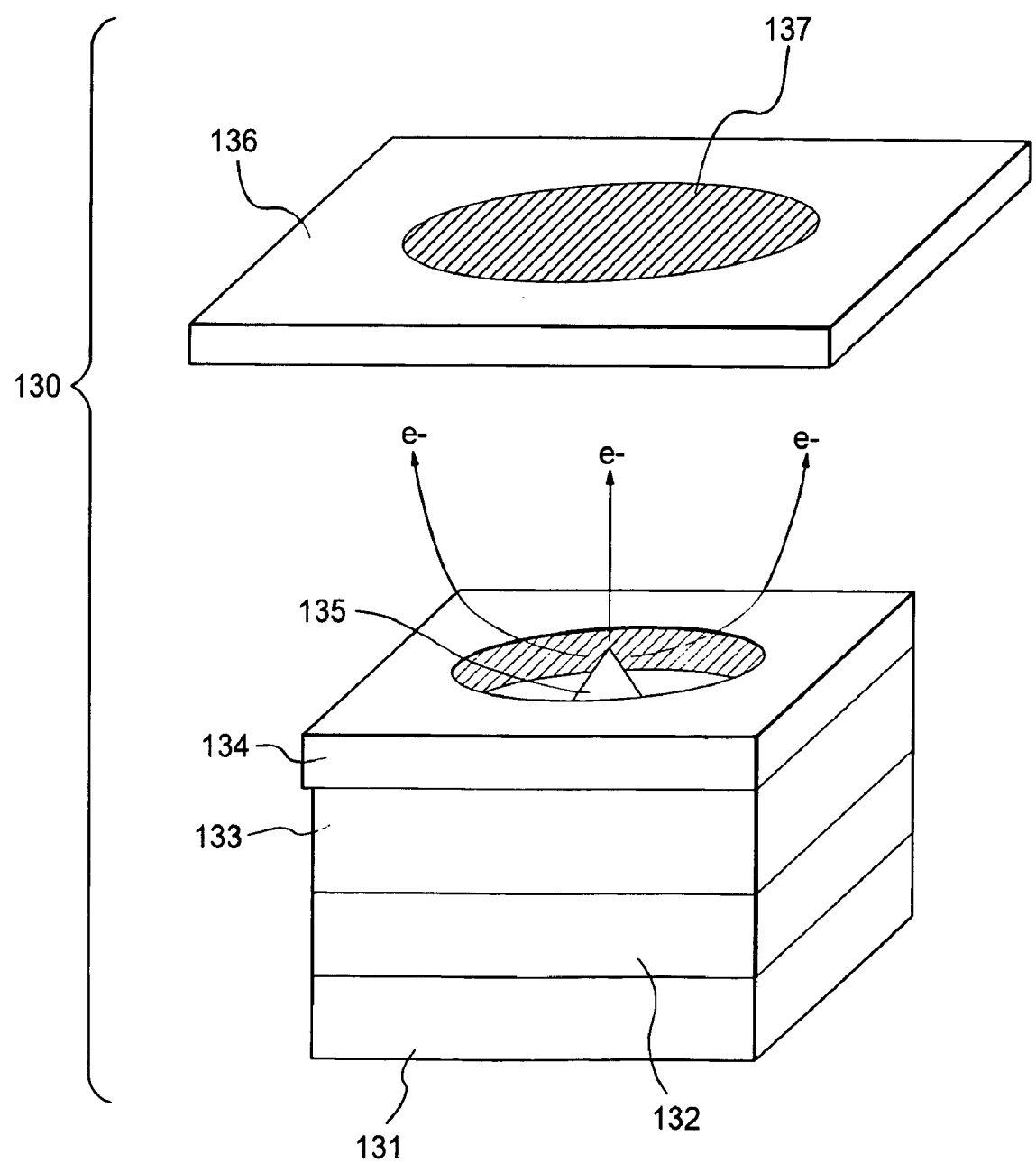
FIG. 13 is a schematic perspective view showing a conventional vertical FE.

Meanwhile, regarding an electron beam obtained on an anode in x direction, a maximum Xd (e.g., a maximum throw from the center of the conical beam 137 shown in FIG. 13) is proportional to $\sqrt{\sqrt{(Vf/Va)}}$ according to a simple computing, wherein Va represents a voltage applied between an anode and a cathode.

As indicated by the above relationship, an increase in Vf raises a beam diameter.

Moreover, according to the above-configuration, it is necessary to minimize a distance d and a curvature r to reduce Vf.

Figure 14:
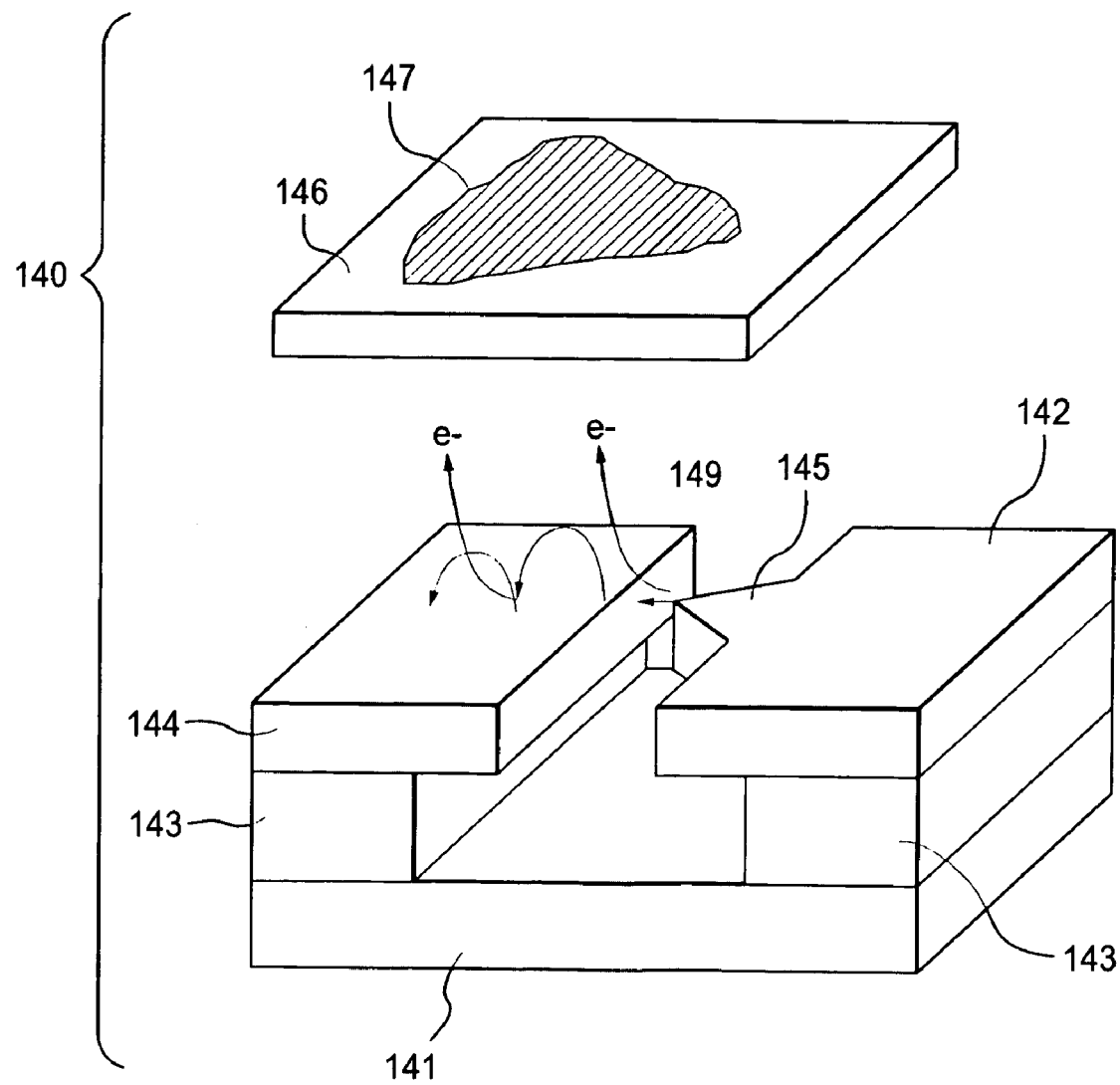
FIG. 14 is a schematic perspective view showing conventional horizontal FE.

Referring to FIGS. 13 and 14, which respectively depict a conventional spindt type 130 and lateral type 140, the shape of beam of the conventional configuration will be described. Here, in the figures, reference numerals 131 and 141 denote substrates, reference numerals 132 and 142 denote emitter electrodes, reference numerals 133 and 143 denote insulating layers, reference numeral 135 and 145 denote emitters, reference numerals 136 and 146 denote anodes, and reference numerals 137 and 147 denote the shapes of electron beam emitted on the anodes as the common numerals.

In the case of the above-mentioned spint type, as shown in FIG. 13, when a voltage Vf is applied between the emitter 135 and the gate 134, an electric field is enhanced on the projecting end of the emitter 135 and an electron is emitted from around the end of the conical emitter to a vacuum.

An electric field on the end of the emitter 135 is formed with a limited area according to the shape of the emitter 135. Hence, an electron is drawn from the limited area of the end of the emitter 135 in a perpendicular direction to a direction of the electric field.

At this moment, electrons with a variety of angles are emitted. An electron having a large angle component is drawn to a direction of the gate. When a circular gate 134 is formed, the distribution of electrons on the anode 136 is formed as the beam shape 137, which is substantially circular as shown in FIG. 13.

Namely, the obtained shape of beam is closely associated with the shape of the gate and a distance between the gate and the emitter.

In the case of a lateral type FE (FIG. 14) in which extraction directions of electrons are aligned, an extremely strong electric field (lateral electric field) is generated between the emitter 145 and the gate 144 substantially in parallel with the surface of the substrate 141. Consequently, as for electrons emitted from the emitter 145, some electrons 149 are drawn into a vacuum, and the other electrons are taken into the gate electrode 144.

In the case of the configuration shown in FIG. 14, an electric-field vector for emitting electrons (an electric field from the emitter 145 to the gate 144) is different in orientation from a direction of an electric-field vector provided toward the anode (anode electrode) 146. Therefore, emitted electrons form a large distribution (beam spot) of electrons on the anode 146.

Here, an electric field where electrons are drawn from the emitter 145 (referred to as "lateral electric field" for convenience, and the enhancement effect of the electric field according to the shape of the emitter is ignored) and an electric field toward the anode (referred to as "vertical electric field") will be considered.

Besides, in the configurations of FIGS. 13 and 14, the "lateral electric field" is also referred to as "electric field substantially in parallel with the surface of the substrate 131 (141)". Moreover, particularly in the configuration of FIG. 14, the electric field is also referred to as "electric field in an opposing direction of the gate 144 and the emitter 145".

Also, in the configurations of FIGS. 13 and 14, the "vertical electric field" can also be referred to as "electric field substantially perpendicular to the surface of the substrate 131 (141)" or "electric field in an opposing direction of the substrate 131 (141) and the anode 136 (146)".

As described above, an electron emitted from the emitter 145 is firstly drawn by a lateral electric field and is emitted toward the gate 144. And then, the electron is drawn upward by the vertical electric field and reaches the anode 146.

At this moment, an intensity ratio of strengths of the lateral electric field and the vertical electric field and relative positions of electron emission point are important.

When the lateral electric field is stronger than the vertical electric field by an order of magnitude, most of electrons emitted from the emitter gradually change their trajectories due to radial potential formed by the lateral electric field, and the electrons travel toward the gate. Some electrons colliding with the gate are emitted again by scattering. After emission, the electrons are repeatedly scattered while spreading on the gate by repeatedly traveling on oval trajectories until the electrons are captured by the vertical electric field. At this moment, the number of emitted electrons decreases. And then, when scattered electrons travel beyond an equipotential line (may be referred to as "stagnation point") produced by the gate potential, the electrons are drawn upward by the vertical electric field for the first time.

When the lateral electric field and the vertical electric field are approximately equal in strength to each other, although extracted electrons change its trajectories due to a radial potential, the constraint of an electric field is eased. Thus, it is possible to produce an electron trajectory captured by the vertical electric field without collision with the gate 144.

Figure 6:
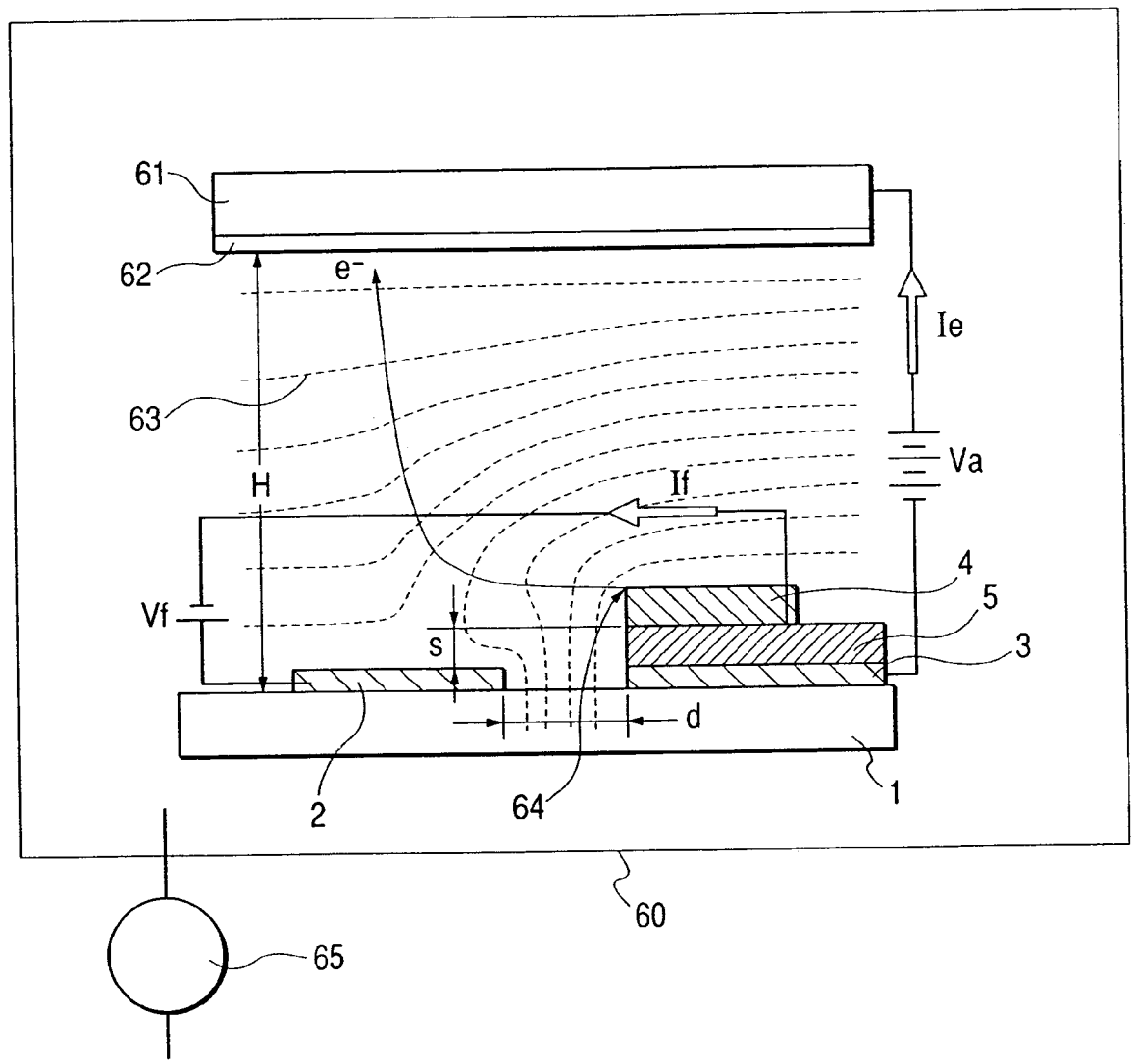
FIG. 6 is a schematic diagram showing that an electron-emitting device is operated according to an example of the present invention.

It was found that when the lateral electric field and electric field are approximately equal in strength to each other, an electron emission point from the emitter 145 is gradually shifted upward from a plane including the gate 144 to a plane including the anode 146 (see FIG. 6). In this case, emitted electrons do not collide with the gate 144 at all but can travel on trajectories to be captured by the vertical electric field.

Further, as a result of the study of an electric field ratio, it is found that if a distance is d between the gate electrode 144 and the end of the emitter electrode 145, a potential difference (potential difference between the gate electrode and the emitter electrode) is V1 when the device is driven, a distance is H between the plate (anode) and the substrate (device), and a potential difference is V2 between the plate (anode) and a cathode (emitting electrode), when the lateral electric field is 50-time larger than the vertical electric field, trajectories are drawn such that extracted electrons are collided with the gate.

Moreover, the inventor found a height s causing substantially no scattering on the gate electrode 2 (height s is defined as a distance between a plane including a part of the surface of the gate electrode 2 and being disposed substantially in parallel with the surface of the substrate 1, and a plane including the surface of an electron-emitting member 4 and being disposed substantially in parallel with the surface of the substrate 1 (see FIG. 6)). The height s is dependent upon a ratio of the vertical electric field and a lateral electric field (a ratio of the vertical electric field strength and the lateral electric field strength). The height s needs to be lower as the vertical electric fields is lower, and the height s needs to be higher as the lateral electric field is larger.

A practical fabrication range of the height s is not less than 10 nm nor more than 10 μm.

In the conventional configuration shown in FIG. 14, the gate 144 and the emitter (142, 145) are provided on the same surface at an equal height. Additionally, since the lateral electric field is stronger than the vertical electric field by an order of magnitude, the amount of extracted electrons into a vacuum is prone to decrease because of the collision with the gate.

Furthermore, in the conventional configuration, the thickness and width of the gate electrode and the relative position of the gate, the emitter, and the anode were determined for the purpose of enhancing the intensity of the lateral electric field. Hence, the distribution spreads regarding electrons obtained on the anode.

As described above, in order to reduce the distribution of electrons reaching the anode 146, the following points need to be considered. 1) Reducing a driving voltage (Vf), 2) aligning the extraction directions of electrons, 3) when scattering is found on the trajectories of electrons and on the gate, 4) a electron-scattering mechanism (particularly elastic scattering).

According to the electron-emitting device using fibrous carbon of the present invention, a fine distribution of electrons emitted on the anode electrode is compatible with increasing the efficiency of electron emission (reducing emitted electrons absorbed by the gate electrode).

The following will discuss the configuration of the electron-emitting device of the present invention.

Figure 1A:
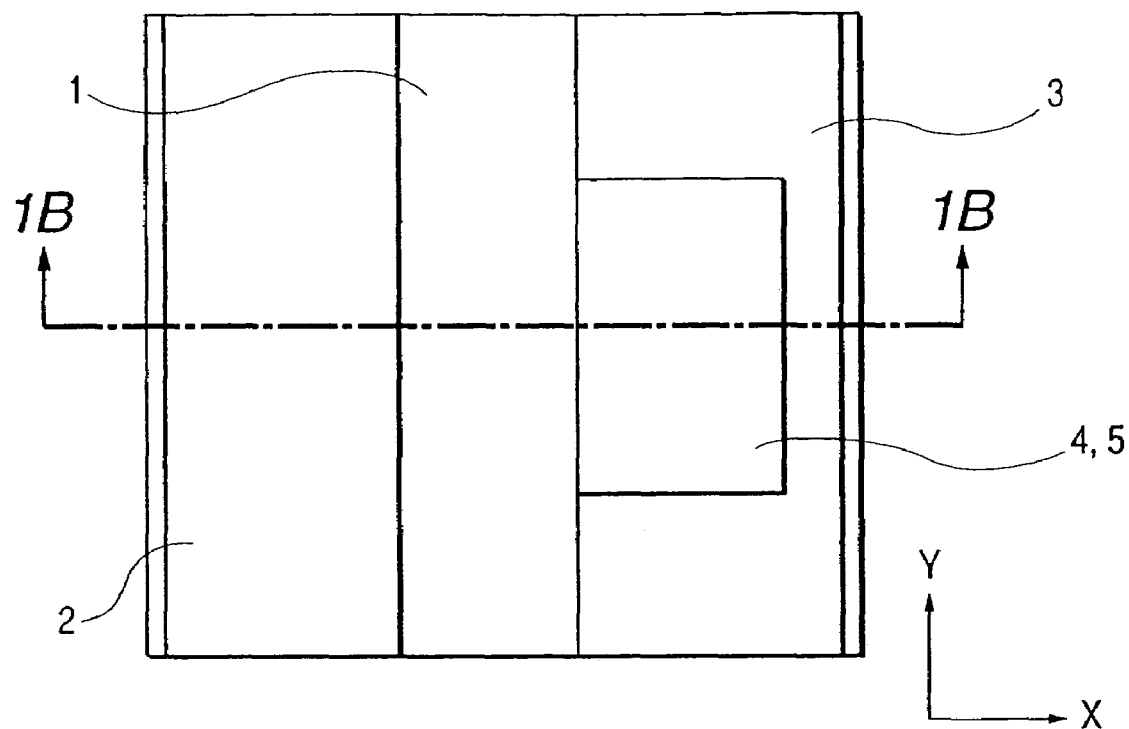
FIGS. 1A and 1B are schematic structural diagrams showing an electron-emitting device according to Example 1 of the present invention.
Figure 1B:
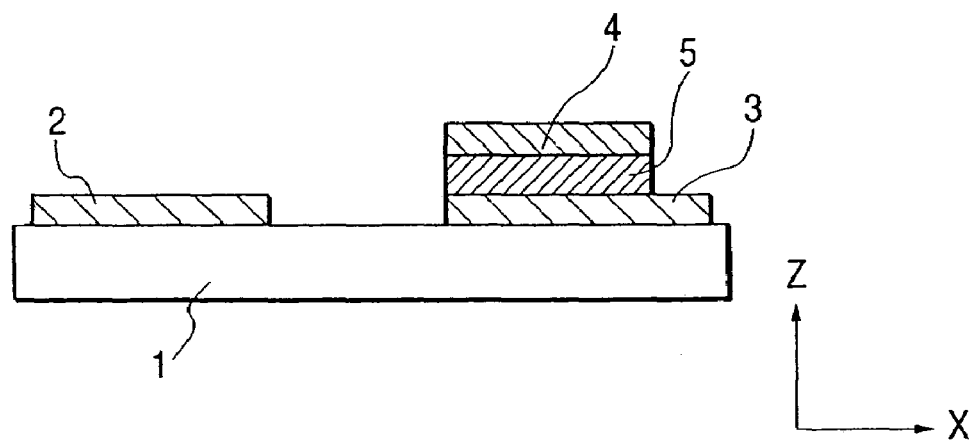

FIG. 1A is a plan view schematically showing an example of the electron-emitting device of the present invention. FIG. 1B is a section view taken along line 1B-1B shown in FIG. 1A. FIG. 6 is a section view schematically showing that an electron-emitting apparatus of the present invention is driven in which an anode electrode is disposed above the electron-emitting device of the present invention.

In FIGS. 1 and 6, reference numeral 1 denotes an insulating substrate, reference numeral 2 denotes a extracting electrode (referred to as a "gate electrode" or a "second electrode"), reference numeral 3 denotes a negative electrode (also referred to as a "cathode electrode" or a "first electrode"), reference numeral 4 denotes an electron-emitting material (also referred to as an "electron-emitting member" or an "emitter material") disposed on the negative electrode 3, and reference numeral 5 denotes a layer for selectively growing fibrous carbon that is made of oxide of a material selected form Ti, Zr, Nb, and Al. The fibrous carbon for forming the electron-emitting material 4 is electrically connected to the electrode 3.

Besides, when the layer 5 for selectively growing fibrous carbon is formed with a large thickness, since the layer 5 is made of oxide, electrical connection between fibrous carbon and the electrode 3 may be weakened. Therefore, in order to sufficiently obtain electrical connection between fibrous carbon and the electrode 3, at least the surface of the layer 5 for forming fibrous carbon is composed of oxide of a material selected from Ti, Zr, Nb, and Al, and the other parts are made of metal.

As shown in FIGS. 1 and 6, in the electron-emitting apparatus of the present invention, the plane including the surface of the electron-emitting member 4 substantially in parallel with the surface of the substrate 1 is disposed farther from the surface of the substrate than the plane including a part of the surface of the gate electrode 2 substantially in parallel with the surface of the substrate 1. In other words, in the electron-emitting apparatus of the present invention, the plane including a part of the surface of the electron-emitting member 4 in parallel with the surface of the substrate 1 is disposed between an anode electrode 61 and the plane including a part of the extracting electrode 2 substantially in parallel with the surface of the substrate. With this configuration, it is possible to reduce electrons captured by the gate electrode and reduce spot diameter of an electron beam emitted onto the anode electrode.

Besides, in the electron-emitting device of the present invention, the electron-emitting member 4 is disposed at a height s (defined by a distance between the plane including a part of the surface of the gate electrode 2 substantially in parallel with the surface of the substrate 1 and the plane including the surface of the electron-emitting member 4 substantially in parallel with the surface of the substrate 1), where substantially no scattering occurs on the gate electrode 2.

The height s is dependent upon a ratio of the vertical electric field and the lateral electric field (vertical electric field intensity/lateral electric field intensity). The height needs to be lower as a ratio of the vertical electric field and a lateral electric field is lower, and the height needs to be higher as the lateral electric field is larger. The practical range of the height s is not less than 10 nm nor more than 10 µm.

Further, in the electron-emitting apparatus of the present invention, according to the configuration of FIG. 6, when a distance is d between the cathode 3 and the gate electrode 2, a potential difference (voltage between the cathode 3 and the electrode 2) is Vf when the electron-emitting device is driven, a distance is H between the surface of the substrate 1 and the anode electrode 61, and a potential difference is Va between the anode electrode 61 and the cathode electrode 3, an electric field when driving (lateral electric field): E1=Vf/d is set to be not less than 1 times nor more than 50 times stronger than the electric field between the anode 61 and the cathode 3 (vertical electric field).

Therefore, it is possible to eliminate a ratio of electrons colliding with the gate electrode after being emitted from the cathode electrode 3. Consequently, there are provided the electron-emitting device and the electron-emitting apparatus with the extremely small spread of the emitted electron beam and with high electron emission efficiency.

Additionally, the "lateral electric field" of the present invention is also referred to as the "electric field substantially in parallel with the surface of the substrate 1" or the "electric field in an opposing direction of the gate electrode 2 and the cathode electrode 3". Further, the "vertical electric field" of the present invention is also referred to as the "electric field substantially in a perpendicular direction to the surface of the substrate 1" or the "electric field in an opposing direction of the substrate 1 and the anode electrode 61".

As the insulating substrate 1, it is possible to adopt a substrate which has a sufficiently cleaned surface and is made of quartz glass, glass in which the content of impurity such as Na is reduced and is partially substituted by K or the like, soda lime glass, a layered body having $SiO_2$ layered on the silicon substrate and the like by sputtering and the like, or an insulating substrate made of ceramic including aluminum.

The extracting electrode (gate electrode) 2 and the cathode electrode 3 are conductive and are formed by a typical vacuum film-forming technique such as vapor deposition and sputtering scheme or by photo lithography technique. The electrodes (2, 3) are made of a material suitably selected from carbon, metal, metal nitride, metal carbide, metal boride, a semiconductor, and a semiconductor-metal compound, preferably from a heat-resistant material such as carbon, metal, metal nitride and metal carbide. The electrodes has a thickness of several tens nm to several tens µm.

Besides, when a potential drop may occur due to a small thickness of the electrode or when the device is used in a matrix, a low-resistance wiring metallic material may be used as necessary. However, the usage is limited to a part not being associated with electron emission.

Moreover, in the above example, the cathode electrode 3 and the layer 5 for selectively growing fibrous carbon are composed of different members. For example, the layer 5 for selectively growing fibrous carbon may be formed by allowing an electrode made of a material selected from Ti, Zr, Nb, and Al to constitute the cathode electrode 3 and oxidizing the surface.

The electron-emitting device of the present invention is made of fibrous carbon as the emitter (electron-emitting member) 4. Additionally, "fibrous carbon" of the present invention is also referred to as "a columnar substance comprising carbon as a main component" or "a linear substance comprising carbon as a main component". Further, "fibrous carbon" of the present invention is also referred to as "fiber comprising carbon as a main component". Furthermore, "fibrous carbon" of the present invention specifically includes carbon nanotube, graphite nanofiber, and amorphous carbon fiber. Graphite nanofiber is the most preferable as the electron-emitting member 4.

As described above, regarding a distance and a driving voltage between the extracting electrode 2 and the cathode electrode 3, when comparison is made between an electron-emitting electric field (lateral electric field) of a used cathode material and the vertical electric field required for forming an image, it is preferable to set an electron-emitting electric field at about 1 to 50 times larger than a vertical electric field.

When a light emitting member such as a phosphor or the like is disposed on the positive electrode (anode electrode), a necessary vertical electric field is preferable in the range of not less than $10^{-1}$ V/µm nor more than 10 V/µm. For example, when a distance is 2 mm between a positive electrode (anode electrode) and a cathode electrode and 10 kV is applied therebetween, the vertical electric field is 5V/µm then. In this case, an emitter material (electron-emitting member) 4 to be used has an electron-emitting electric field of larger than 5 V/µm. A distance and a driving voltage thereof are determined so as to correspond to a selected electron-emitting electric field.

The above-mentioned fibrous carbon is preferable as a material having such a threshold electric field of several V/µm.

Figure 11:
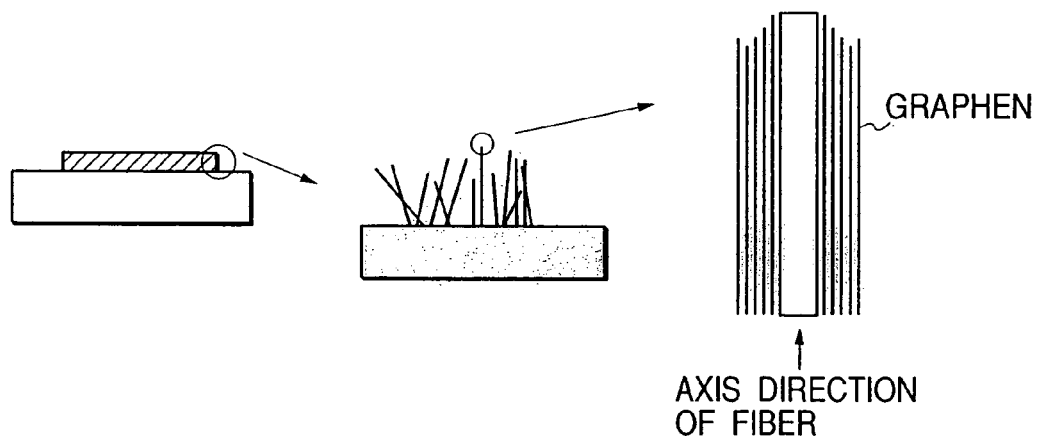
FIG. 11 is a schematic diagram showing the configuration of a carbon nanotube.
Figure 12:
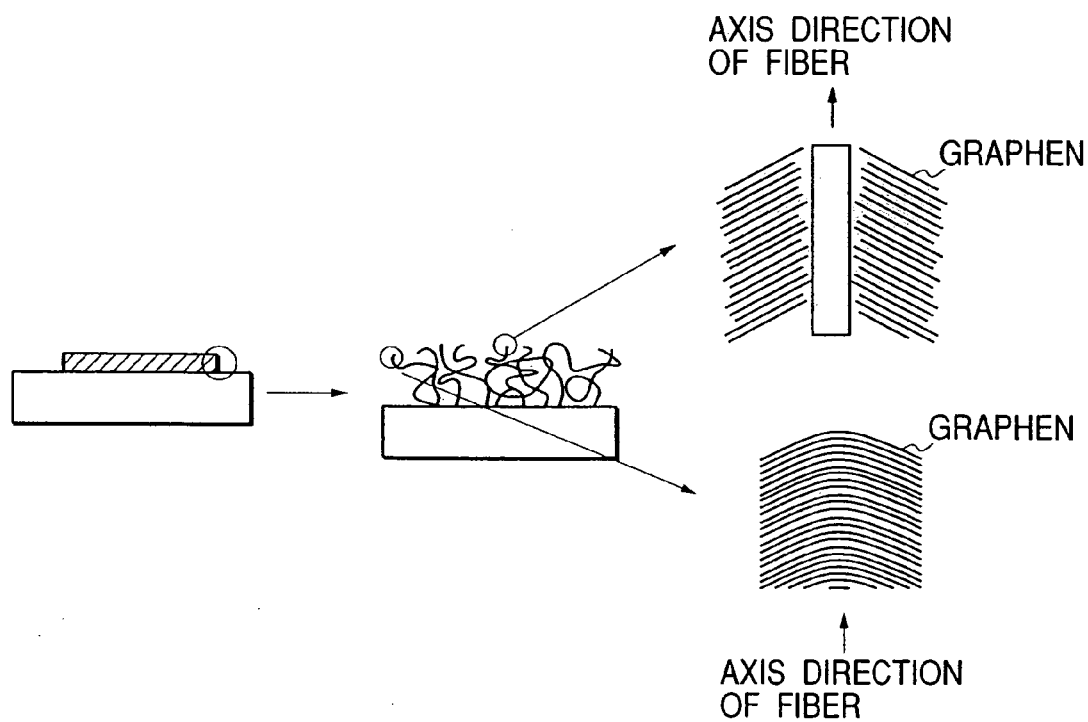
FIG. 12 is a schematic diagram showing the configuration of a graphite nanofiber.

FIGS. 11 and 12 show examples of configurations of fibrous carbon suitable for the present invention. In each of the schematic drawing, the left shows a configuration found at an optical microscope level (to 1000 times), the center shows a configuration found at a scanning electron microscope (SEM) level (to 30000 times), and the right shows a configuration of carbon found at a transmission electron microscope (TEM) level (to million times).

As shown in FIG. 11, graphen formed into a cylinder (cylinder having a multiplex structure is referred to as a multi-wall nanotube) is referred to as a carbon nanotube. Particularly when a tube end is opened, a threshold value is lowered to the minimum.

FIG. 12 shows fibrous carbon may be produced at a relatively low temperature. Fibrous carbon having such a configuration is composed of a graphen layered body (thus, it may be referred to as "graphite nanofiber" and has an amorphous structure whose ratio is increased with temperature). To be specific, graphite nanofiber is a fibrous substance in which graphens are layered (laminated) in the longitudinal direction thereof in the axis direction of the fiber. In other words, as shown in FIG. 12, graphite nanofiber is a fibrous substances in which a plurality of graphens are arranged and layered (laminated) so as not to be parallel to the axis of fiber.

Meanwhile, carbon nanotube is a fibrous substance in which graphens are arranged (in cylindrical shape) around the longitudinal direction (axial direction of fiber). In other words, it is a fibrous substance in which graphens are arranged substantially in parallel to the axis of the fiber.

Besides, a single surface of graphite is referred to as "graphen" or "graphen sheet". To be specific, graphite is a lamination in which carbon planes, each of which is a spread of regular hexagons consisting of covalent bouds of carbon atoms in $sp^2$ hybrid, are layered at intervals of distance of 3.354 Å. Each of the carbon planes is referred to as "graphen" or "graphen sheet".

Each fibrous carbon has an electron-emitting threshold value at about 1 to 10 V/µm and is very preferable as a material of the emitter (electron-emitting member) 4 of the present invention.

Particularly, regarding an electron-emitting device using graphite nanofiber, it is possible to achieve an electron-emitting device, which emits an electron with a low-electric field, obtains a large emitting current, is manufactured with ease, and has stable electron-emitting characteristics. The configuration of the device is not limited to that of the present invention. For example, an electron-emitting device can be formed by using graphite nanofiber as an emitter and preparing an electrode for controlling electrons emitted from the emitter. Further, a light-emitting apparatus such as a lamp can be formed by using a light emitting member which emits light under irradiation of electrons emitted from graphite nanofiber. Furthermore, a plurality of electron-emitting devices using the graphite nanofiber is arranged and an anode electrode having a light emitting member such as a phosphor is prepared to form an image display apparatus such as a display. In an electron-emitting apparatus, a light-emitting apparatus, and an image display apparatus that use graphite nanofiber, it is possible to emit electrons in a stable manner without keeping the inside at an ultrahigh vacuum as required in the conventional electron-emitting device, and it is possible to obtain a large amount of emitting electrons in a low electric field. Hence, it is possible to manufacture a reliable apparatus with great ease.

The above fibrous carbon can be formed by using a catalyst (material for encouraging the deposition of carbon) to decompose hydrocarbon. Carbon nanotube and graphite nanofiber are different from each other in a type of a catalyst and a decomposing temperature.

As the catalyst material, it is possible to adopt Fe, Co, Pd, and Ni or an alloy of a material selected from the above as a nuclear for forming fibrous carbon.

Particularly, Pd can form graphite nanofiber at a low temperature (at 400° C. or higher). Meanwhile, when Fe or Co is used as a catalyst, a forming temperature of carbon nanotube needs to be 800° C. or higher. A graphite nanofiber material can be produced at a low temperature when Pd is used. Hence, Pd is preferable in view of the influence of the other members and the manufacturing cost.

Moreover, Pd makes it possible to use palladium oxide as a nuclear forming material by using a characteristic of oxide reduced by hydrogen at a low temperature (room temperature).

When hydrogen is reduced in palladium oxide, it is possible to form an initial aggregation nuclear at a relatively low temperature (200° C. or lower) without using thermal aggregation of a metallic thin film that has been conventionally used as a typical nuclear forming scheme or generation and evaporation of ultra-fine particles that may cause explosion.

As the carbon hydrogen gas, for example, it is possible to adopt hydrocarbon gas such as ethylene, methane, propane, and propylene or organic solvent vapor such as ethanol and acetone.

Additionally, as a material as fibrous carbon, it is possible to adopt a material such as CO and $CO_2$ as well as the hydrocarbon gas.

As a material of the layer 5 shown in FIGS. 1 and 6, as described above, it is possible to adopt an oxide of a material selected from Ti, Zr, Nb, and Al that has growth selectivity of fibrous carbon or an oxide semiconductor made of a material selected from Ti, Zr, and Nb.

A stoichiometry oxide of the Ti, Zr, Nb is an insulator. A weak oxide or a suboxide has a large number defects therein to form a semiconductor having a loss of oxygen and so on.

However, Al does not form an oxide film having conductivity. Therefore, when an oxide made of Al is used, it is necessary to use a conducting mechanism, in which electrons perform tunneling on an insulating film, to obtain electrical connection between fibrous carbon and the cathode electrode 3, by reducing a thickness of an oxide film layer formed on a surface of Al.

In the present embodiment, Pd is baked for several tens minutes at about 300° C. on an oxide made of a material selected from Ti, Zr, Nb, and Al. Thus, palladium oxide is formed. At this moment, Ti, Zr, Nb, or Al is oxidized. The above baking temperature and time does not entirely oxidize the layer 5 but only the surface thereof although depending on the thickness of the initially deposited layer 5. Further, as described above, due to semiconductor characteristics, as a result, the layer 5 formed in the above manner can have conductivity.

Further, since the surface of the layer 5, on which catalyst particles made of a material such as Pd, is made of oxide, it is possible to suppress reaction of the material of the layer 5 and the catalyst particles when fibrous carbon is grown. Consequently, it is possible to grow fibrous carbon with stability and a high density.

Thus, as shown in FIGS. 1A and 1B, a plurality of fibrous carbon is grown on the layer 5 to form the electron-emitting member (emitter) 4.

Regarding the electron-emitting device, the electron-emitting apparatus, and the image-forming apparatus of the present invention, a region having the emitter (electron-emitting member) 4 is hereinafter referred to as an "emitter region" regardless of the presence or the absence of electron emission.

Figure 7:
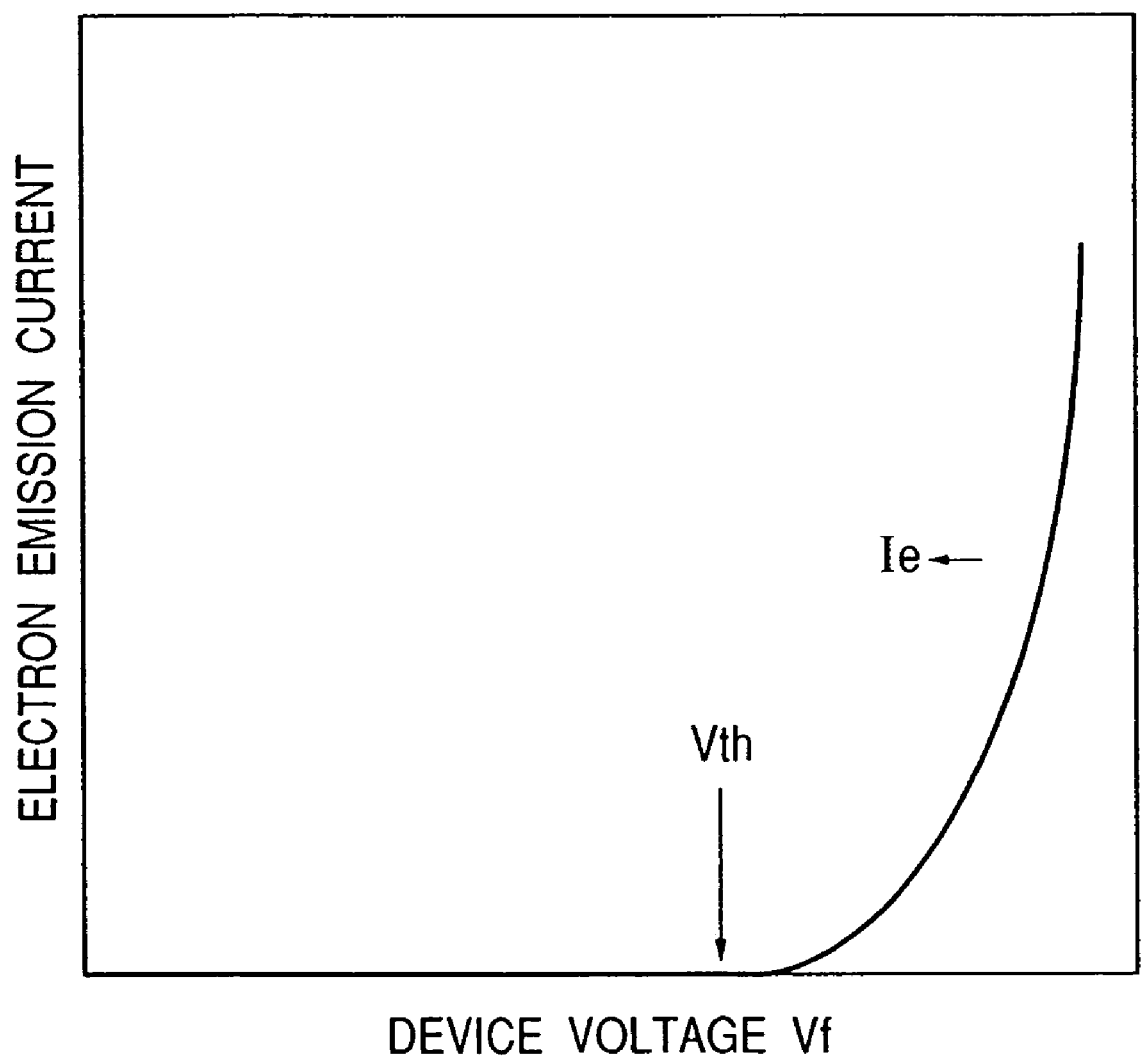
FIG. 7 is a schematic diagram showing operating characteristics of the electron-emitting device according to an example of the present invention.

Referring to FIGS. 6 and 7, the following will explain a position of emitting electrons (electron-emitting region) in the "emitter region" and the operation therein.

The electron-emitting device having a distance of several μm between the cathode electrode 3 and the extracting electrode 2 is provided in a vacuum 60 shown in FIG. 6. A vacuum evacuating device 65 sufficiently performs vacuuming to about $10^{-4}$ Pa. As shown in FIG. 6, the surface of the positive electrode (anode electrode) 61 is positioned at a height H, which is higher than the surface of the substrate 1 by several millimeters, and a potential (voltage Va (several kV)) higher than the cathode electrode 3 and the extraction electrode 2 is applied to the anode electrode 61 by using a voltage source ("second voltage applying means" or "second potential applying means"). In this case, a potential is applied between the cathode electrode 3 and the anode electrode 61. A voltage applied to the anode can be also determined according to a ground potential. Additionally, the surface of the substrate 1 and the surface of the positive electrode 61 are disposed substantially in parallel with each other.

In the device, a voltage of about several tens V is applied between the cathode electrode 3 and the extracting electrode 2 as a driving voltage Vf by a power supply (not shown, "first voltage applying means" or "first potential applying means"), and measurement is made on a device current If, which flows between the electrodes 2 and 3, and an electron-emitting current Ie applied to the anode electrode.

At this moment, equipotential lines 63 are formed as shown in FIG. 6 (electric fields (directions of electric fields) are formed substantially in parallel with the surface of the substrate 1). It is expected that the most concentrated point of electric fields is the portion of the electron-emitting member 4 closest to the anode electrode that is indicated by reference numeral 64 and the point faces a gap. It is expected that electrons are mainly emitted from a concentrated point of electric fields of electron-emitting materials disposed around the concentrated point of electric fields. The device has Ie characteristics shown in FIG. 7. Namely, Ie rises rapidly from about a half of an applied voltage, and If (not shown) is similar to Ie in characteristics. A value of If is sufficiently small as compared with Ie.

Figure 8:
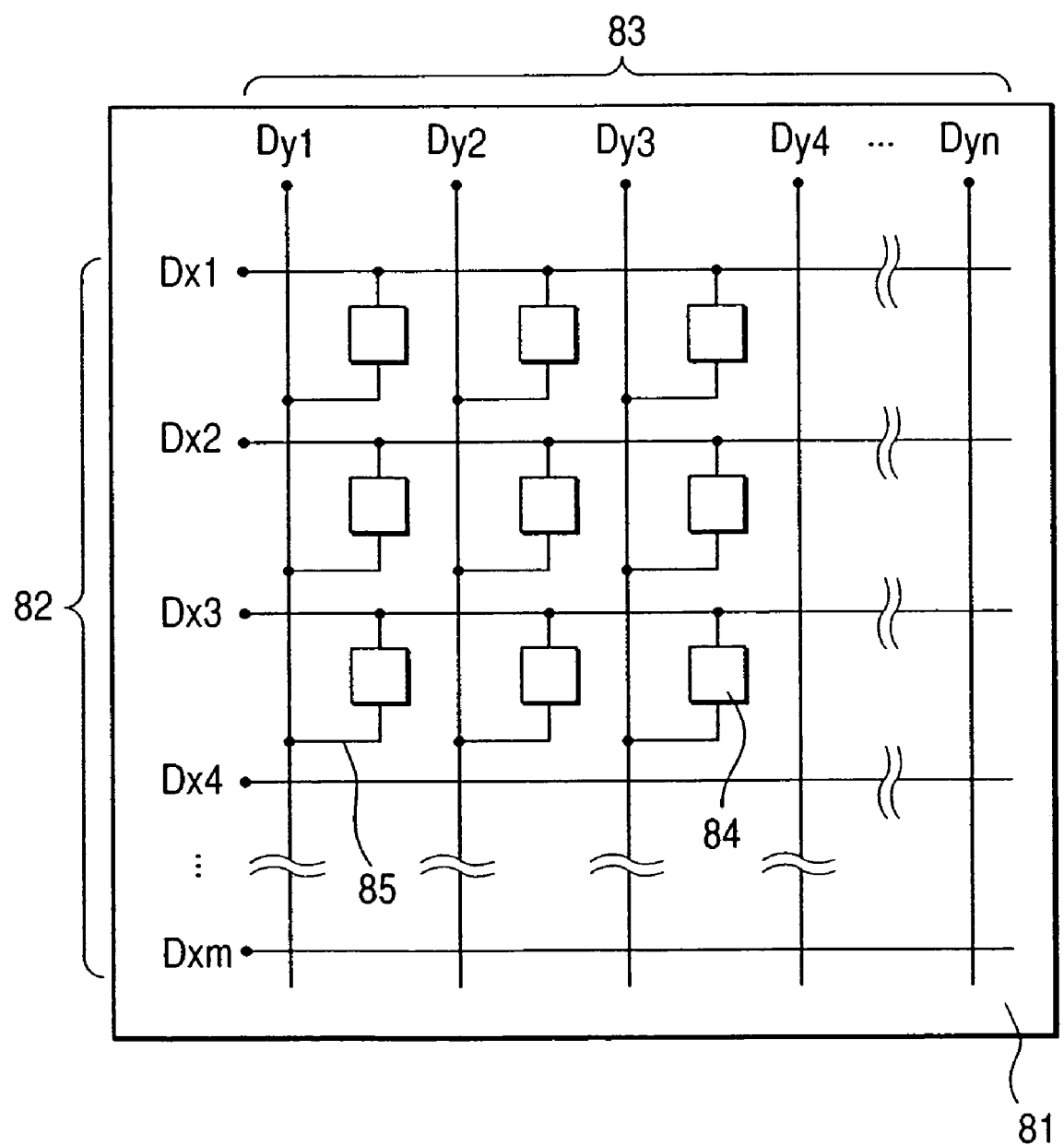
FIG. 8 is a schematic structural diagram showing a passive-matrix circuit of an electron source according to an example of the present invention.

Next, referring to FIG. 8, the following will discuss an electron source and an image-forming apparatus having a plurality of electron-emitting devices, which are formed according to the above-mentioned principle. In FIG. 8, reference numeral 81 denotes an electron source substrate, reference numeral 82 denotes X-direction wiring, and reference numeral 83 denotes Y-direction wiring. Reference numeral 84 denotes electron-emitting devices and reference numeral denotes connection.

The X-direct ion wiring 82 is composed of m wires of Dx1, Dx2, . . . , and Dxm, each being made of conductive metal and so on formed by a scheme such as vacuum deposition, printing scheme, and sputtering scheme. A material, a thickness and a width of wiring are set as appropriate.

The Y-direction wiring 83 is composed of n wires of Dy1, Dy2, . . . , and Dyn which are formed in the same manner as the X-direction wiring 82.

Between the X-direction wiring 82 having m wires and the Y-direction wiring 83 having n wires, an interlayer insulting film (not shown) is provided to electrically insulate the wiring (m and n are both positive integers).

The interlayer insulating film (not shown) is made of a material such as $SiO_2$, which is formed by a scheme such as vacuum deposition, printing scheme, and sputtering scheme. The interlayer insulating film is, for example, formed entirely or partially on the electron source substrate 81 having the X-direction wiring 82 formed thereon with a predetermined pattern. Particularly, a film thickness, a material, and a manufacturing scheme thereof are determined as appropriate to be resistant to a potential difference between the X-direction wiring 82 and the Y-direction wiring 83. The X-direction wiring 82 and the Y-direction wiring 83 are each drawn as external terminals.

A pair of electrodes (not shown) constituting the electron-emitting device 84 is electrically connected to the m wires of the X-direction wiring 82 and the n wires of the Y-direction wiring 83 via the connection 85 made of a material such as conductive metal.

Materials of the X-direction wiring 82, the Y-direction wiring 83, the connection 85, and the pair of device electrodes may be partially or totally the same or different from each other in their constituent element. For example, these materials are appropriately selected from the materials of the device electrode. When the device electrode and the wiring shares the same materials, wiring connected to the device electrode can be referred to as a device electrode.

Scanning signal applying means (not shown), which applies a scanning signal for selecting a row of the electron-emitting devices 84 arranged in X direction, is connected to X-direction wiring 82. Meanwhile, modulating signal generating means (not shown) for modulating each column of electron-emitting devices 84 in response to an input signal is connected to the Y-direction wiring 83. A driving voltage applied to each of the electron-emitting devices is supplied as a difference voltage between a scanning signal and a modulating signal. The difference voltage is applied to the device.

In the above configuration, with passive matrix wiring, it is possible to select each of the devices and drive them in isolation from each other.

Figure 9:
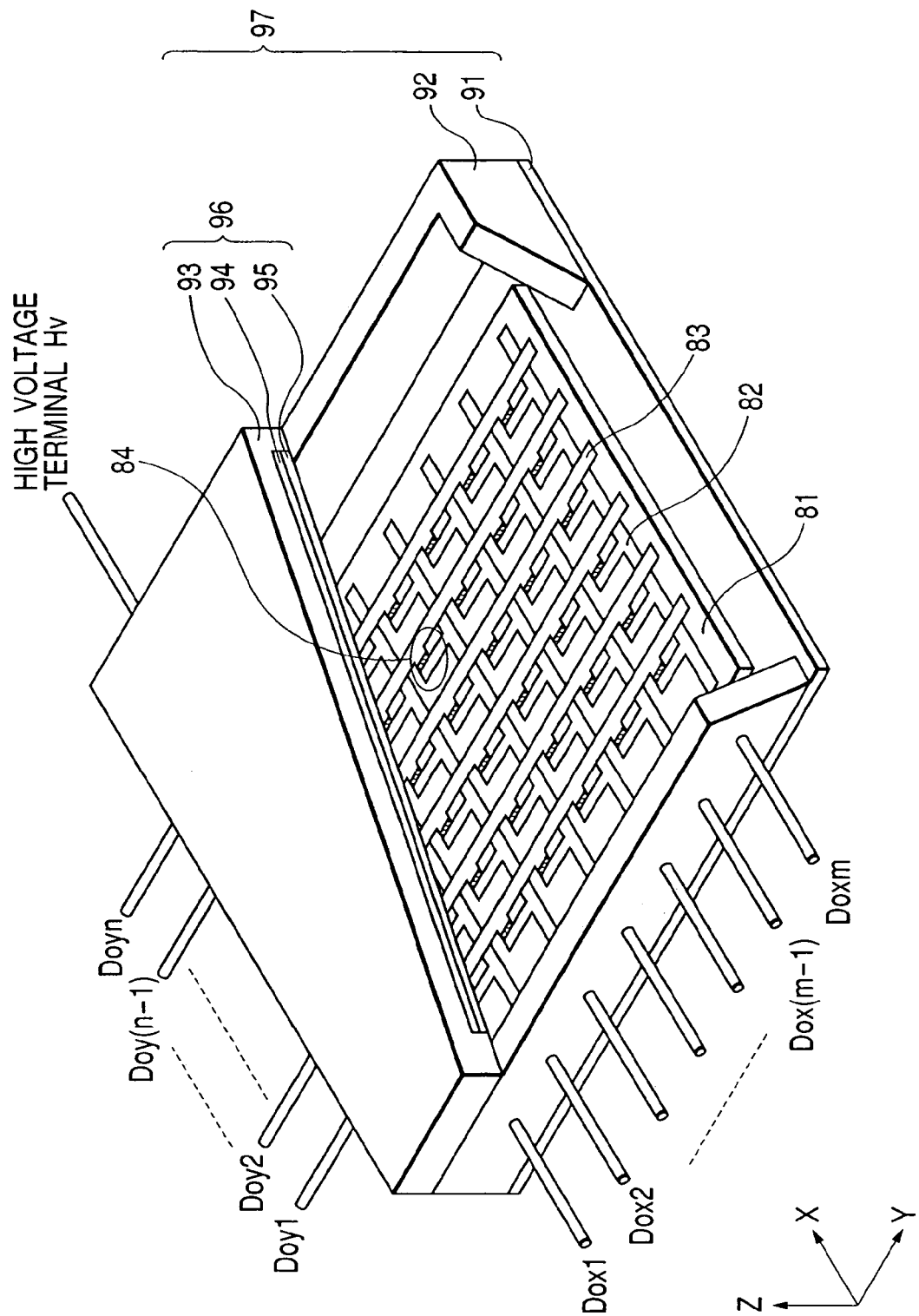
FIG. 9 is a schematic structural diagram showing a display panel of an image-forming apparatus according to an example of the present invention.

Referring to FIG. 9, the following will discuss an image-forming apparatus constituted by an electron source using a passive-matrix electron source. FIG. 9 is a schematic diagram showing an example of a display panel of the image-forming apparatus.

In FIG. 9, reference numeral 81 denotes an electron source substrate, reference numeral 91 denotes a rear plate on which the electron source substrate 81 is fixed, reference numeral 96 denotes a face plate having a fluorescent film 94, a metal back 95, and so on formed on an inner surface of a glass substrate 93. Reference numeral 92 denotes a support frame having the rear plate 91 and the face plate 96 connected thereto by using frit glass and the like. Reference numeral 97 denotes an envelope which is sealed by baking for 10 minutes or more at a temperature range of 400 to 500° C., for example, in an atmosphere, in a vacuum, or in nitrogen.

As described above, the envelope 97 is composed of the face plate 96, the support frame 92, and the rear plate 91. The rear plate 91 is provided mainly for reinforcing the electron source substrate 81. Thus, when the electron source substrate 81 has sufficient strength in itself, the rear plate 91, which is a separate member, is not necessary. Namely, the support frame 92 may be directly sealed onto the electron source substrate 81 and the envelope 97 may be constituted by the face plate 96, the support frame 92, and the electron source substrate 81. Meanwhile, it is possible to form the surrounding member 97 with sufficient strength to an air pressure by providing a support (not shown) referred to as a spacer between the face plate 96 and the rear plate 91.

EXAMPLES

The following will discuss the detail of examples according to the present invention.

Example 1

FIG. 1A is a schematic diagram taken from the top of an electron-emitting device according to Example 1 of the present invention. FIG. 1B is a section view taken along line 1B-1B shown in FIG. 1A.

In FIGS. 1A and 1B, reference numeral 1 denotes an insulating substrate, reference numeral 2 denotes a extracting electrode, reference numeral 3 denotes a cathode electrode, reference numeral 4 denotes an electron-emitting member, and reference numeral 5 denotes a layer where fibrous carbon is grown.

Referring to FIGS. 5A to 5E, the following will discuss the detail of a manufacturing process of the electron-emitting device of this example.

(Step 1)

A quartz substrate is used as the substrate 1. After sufficient cleaning, Ti (not shown) having a thickness of 5 nm and Pt having a thickness of 30 nm are evaporated continuously.

Next, in a photolithography process, a resist pattern is formed using a positive photoresist (AZ1500/manufactured by Clariant International Ltd.).

Figure 5A:
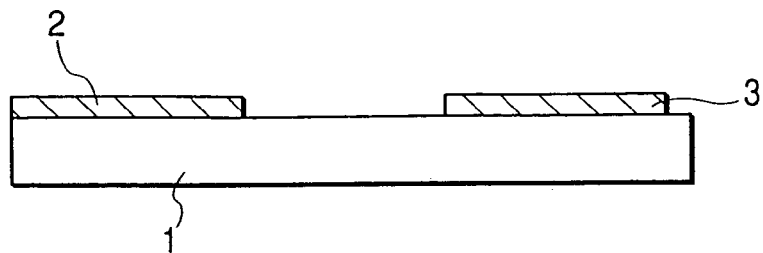
FIGS. 5A, 5B, 5C, 5D and 5E are diagrams showing a manufacturing process of the electron-emitting device according to Example 1 of the present invention.

Next, dry etching is performed on the Pt layer and the Ti layer using Ar gas with the patterned photoresist serving as a mask to form the extracting electrode 2 and the cathode electrode 3 that have an electrode gap (distance) of 5 µm (FIG. 5A).

(Step 2)

Next, Cr is deposited entirely on the substrate 1 with a thickness of about 100 nm by EB evaporation.

And then, in a photolithography process, a resist pattern is formed using a positive photoresist (AZ1500/manufactured by Clariant International Ltd.).

Subsequently, the patterned photoresist is used as a mask, a region for coating electron-emitting materials (100 µm square) is formed on the cathode electrode 3, and Cr on an opening is removed by an etching solution made of cerium nitrate.

Next, Ti is evaporated with a thickness of 50 nm by sputtering scheme.

Figure 5B:
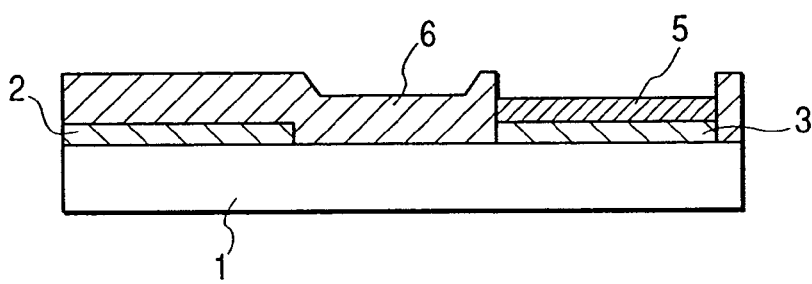

And then, unnecessary Ti and resist are exfoliated at the same time (lift-off scheme) (FIG. 5B).

(Step 3)

A complex solution, in which isopropyl alcohol and so on is applied to Pd complex, is entirely applied to the substrate by spin coating.

After application, a heating operation is performed at 300° C. in an atmosphere. Palladium oxide 51 is formed with a thickness of about 10 nm, and then, remaining Cr is all removed by an etching solution made of made of cerium nitrate.

Figure 5C:
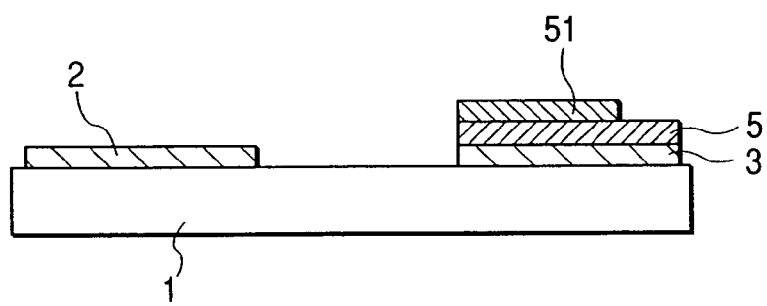

At this moment, the surface of the undercoating Ti layer 5 is oxidized. A sheet resistance of the layer 5 is $1 \times 10^2$ Ω/□ and conductivity is obtained (FIG. 5C).

(Step 4)

Figure 5D:
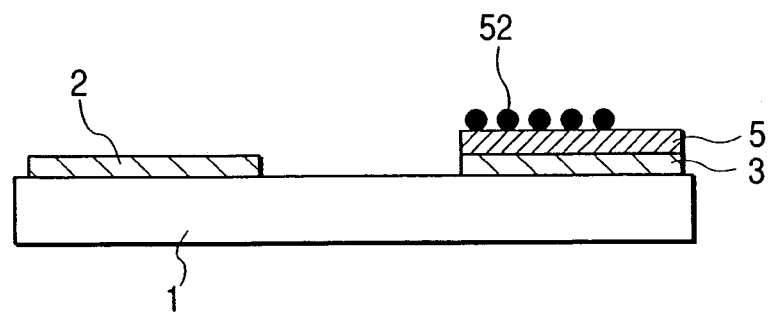

After evacuation of atmosphere, the substrate 1 is heated at 200° C. and is heated in 2%-hydrogen airflow, which is diluted with nitrogen. In this step, particles 52 each having a diameter of about 3 to 10 nm are formed on the surface of the device. At this moment, a density of particles is estimated at $10^{11}$ to $10^{12}$/cm$^2$ (FIG. 5D).

(Step 5)

Subsequently, a heating operation is performed in 0.1%-ethylene airflow, which is diluted with nitrogen, at 500° C. for 10 minutes to form fibrous carbon.

Figure 5E:
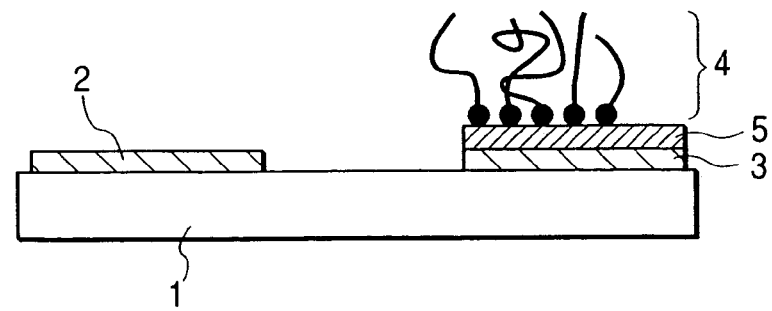

When the electron-emitting device obtained in the above manufacturing steps was observed by a scanning electron microscope, it was found that much fibrous carbon was formed on the Pd applying region while bending and spreading in a fibrous form with a diameter of about 10 to 25 nm. At this moment, fibrous carbon was about 500 nm in thickness (FIG. 5E).

Additionally, in the figures, catalyst particles were disposed on positions making contact with a conductive material. Catalyst particles sometimes existed on the end of the fibrous carbon or a midpoint of fiber.

In order to study electron-emitting efficiency of the above device, the device was disposed in the vacuum apparatus 60 shown in FIG. 6, and the vacuum evacuating apparatus 65 sufficiently performed evacuation until $2 \times 10^{-5}$ Pa. And then, a voltage of Va=10 kV was applied to the positive pole (anode) 61, which was away from the device by H=2 mm, as a positive electrode (anode) voltage. Further, a pulse voltage including a driving voltage of Vf=20 V was applied to the device and measurement was made on a device current If and an electron emission current Ie that were applied at this moment.

The device had Ie characteristics shown in FIG. 7. To be specific, Ie rose sharply from about a half of applied voltage, and when Vf was 15 V, an electron emission current Ie of about 1 μA was measured. Meanwhile, If (not shown) was similar to Ie in characteristics and an If value was smaller than Ie by an order of magnitude.

As described above, the layer 5 having growth selectivity of fibrous carbon was formed on the cathode electrode 3 in the present example. Thus, it was possible to grow fibrous carbon at a predetermined position with a fixed high density.

Moreover, since the layer 5 was used as an electrical connecting layer between fibrous carbon and the electrode 3, it was possible to obtain electrical connection with stability between the fibrous carbon and the electrode 3 and to emit electrons in a stable manner.

In the present example, partially oxidized Ti or an oxide semiconductor made of Ti was used as a material of the layer 5. Instead of Ti, it is possible to adopt Zr, Nb, or Al. Further, even in the case of a material other than these, it is preferably used with growth selectivity of fibrous carbon.

In the present example, after the cathode electrode 3 is formed in Step 1, the layer 5 was stacked on the cathode electrode 3. The cathode electrode 3 and the layer 5 may be formed at the same time by using the same material. At this moment, since the material having growth selectivity of fiber carbon is used as a material, it is possible to form the electron-emitting device with a simpler process.

Beam obtained by the electron-emitting device of the present example was substantially rectangular with a length in Y direction and a width in X direction.

A driving voltage Vf was fixed at 15 V, and a distance H between anodes was fixed at 2 mm. A beam width was measured as shown in Table 1 in which an anode voltage was set at 5 kV and 10 kV and a gap was set at 1 μm and 5 μm.

TABLE 1

|  | Va = 5 kV | Va = 10 kV |
| --- | --- | --- |
| Gap: 1 μm | X direction: 60 μm | X direction: 30 μm |
|  | Y direction: 170 μm | Y direction: 150 μm |
| Gap: 5 μm | X direction: 93 μm | X direction: 72 μm |
|  | Y direction: 170 μm | Y direction: 150 μm |

Besides, an electric field required for driving could be changed by varying the conditions of growing fibrous carbon. Particularly an average particle diameter of Pd, which is formed by reducing palladium oxide, was associated with a diameter of fibrous carbon formed thereafter. It was possible to control an average diameter of Pd by a Pd concentration of a Pd complex and the number of revolutions of spin coating.

When fibrous carbon of the device is observed by a transmission electron microscope, as shown in the right of FIG. 12, graphen was stacked along an axial direction of fibrous carbon. A stacking interval of graphen (in a direction of Z axis) is unclear at a low temperature of about 500° C. and an interval was 0.4 nm. An interval of grid became clear with temperature. An interval was 0.34 nm at 700° C., which is close to 0.335 nm of graphite.

Example 2

Figure 2A:
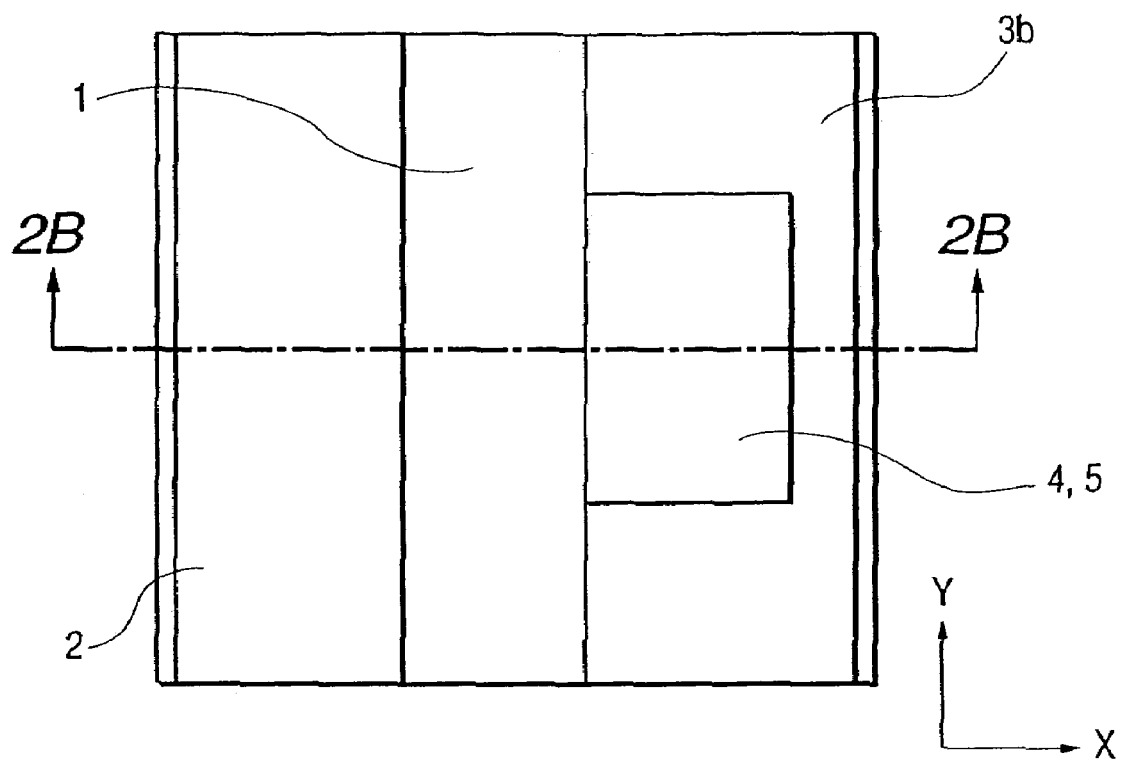
FIGS. 2A and 2B are schematic structural diagrams showing an electron-emitting device according to Example 2 of the present invention.
Figure 2B:
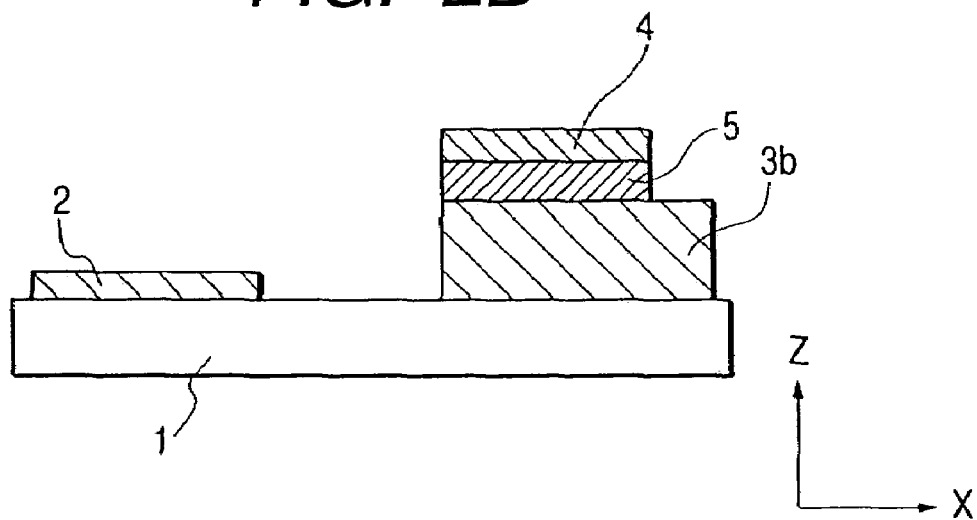

FIGS. 2A and 2B show Example 2.

In the present example, an electron-emitting device was manufactured in the same manner as Example 1 except that the cathode electrode 3b was 500 nm in thickness and the extracting electrode 2 was 30 nm in thickness, and measurement was made on If and Ie.

Other configurations and effects are the same as those of Example 1. Hence, the same members will be indicated by the same reference numerals and the description thereof is omitted.

In the device configuration of the present example, a position for emitting electrons was positively set at a high position (anode side) from the extracting electrode 2 by increasing a thickness of the cathode electrode 3b.

With this configuration, since trajectories of electrodes colliding with the gate were reduced, it was possible to prevent a reduction in efficiency and an increase in beam diameter.

Consequently, in the present device configuration as well, an electron emission current Ie of about 1 μA was measured when Vf was 20 V. Meanwhile, If was similar to Ie in characteristics. A value of If was smaller than Ie by two digits.

Besides, a beam diameter at this moment was substantially equal to that of Table 1.

Example 3

Figure 3A:
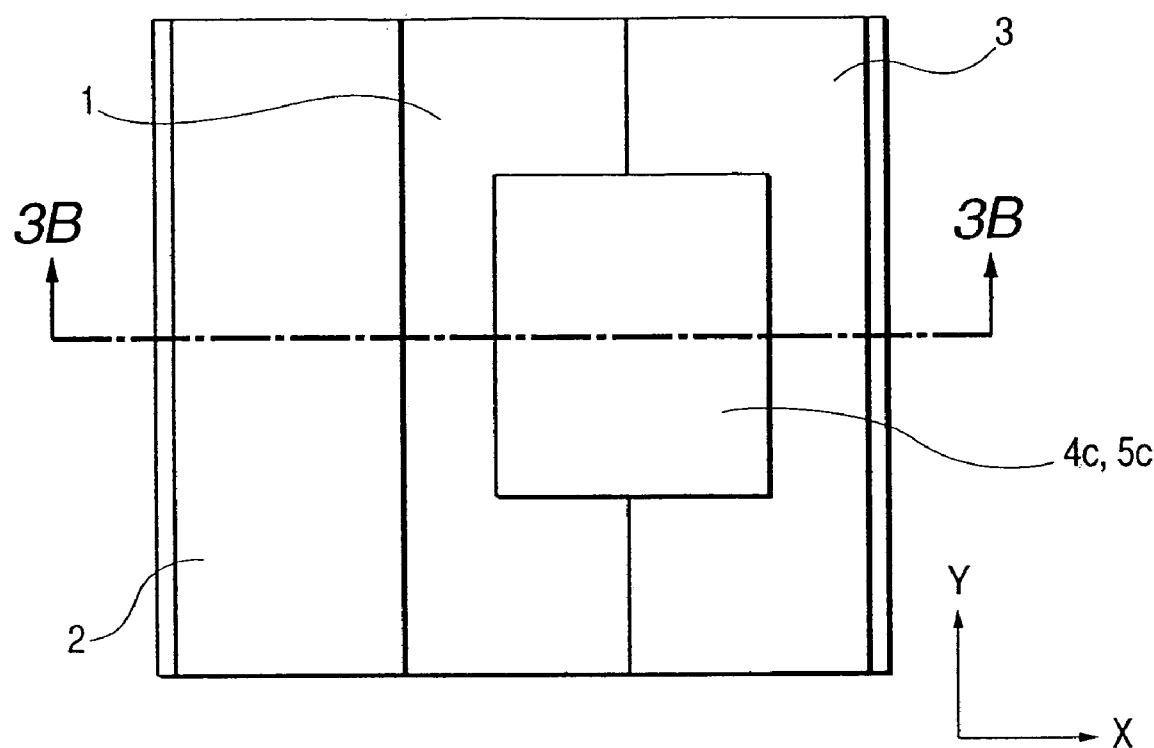
FIGS. 3A and 3B are schematic structural diagrams showing an electron-emitting device according to Example 3 of the present invention.
Figure 3B:
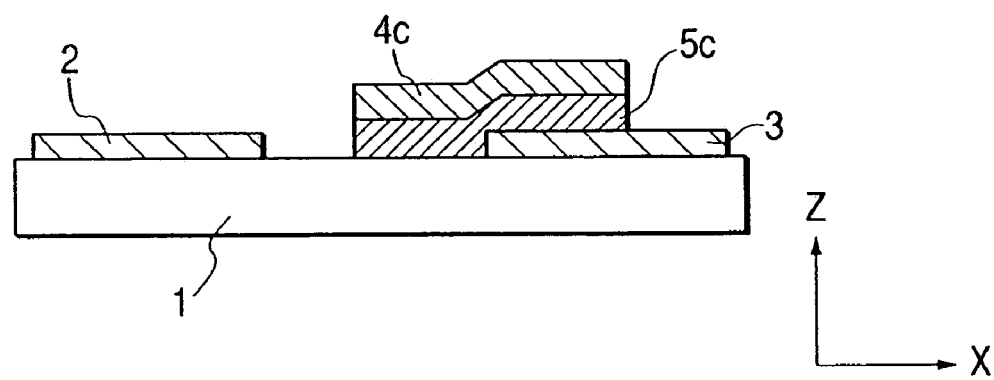

FIGS. 3A and 3B show Example 3.

In the above example, the layer 5 and the electron-emitting member 4 are formed on the cathode electrode 3. In the present example, a layer 5c and an electron-emitting member 4c are formed across the cathode electrode 3 and a gap (space) between the cathode electrode 3 and the gate electrode 2.

In the step 2 of Example 1, a resist pattern is formed in the same step as Example 1 except that a position for forming a resist pattern is changed. Thus, the description thereof is omitted.

Besides, in the present example, the layer 5c and the electron-emitting member 4c are extended to an about intermediate point (about a half of a distance between the gaps) of a gap between the cathode electrode 3 and the gate electrode 2 such that a distance is small between the electron-emitting member 4c and a extracting electrode 2.

This device has an electric field about twice as large as that of the device of Example 1 since its distance between the gaps is smaller than that of Example 1. Accordingly, the driving voltage can be reduced to about 8 V.

Further, since the layer 5 is used as an electrical connecting layer of fibrous carbon, it was possible to emit electrons with stability from fibrous carbon in a gap.

Example 4

Figure 4A:
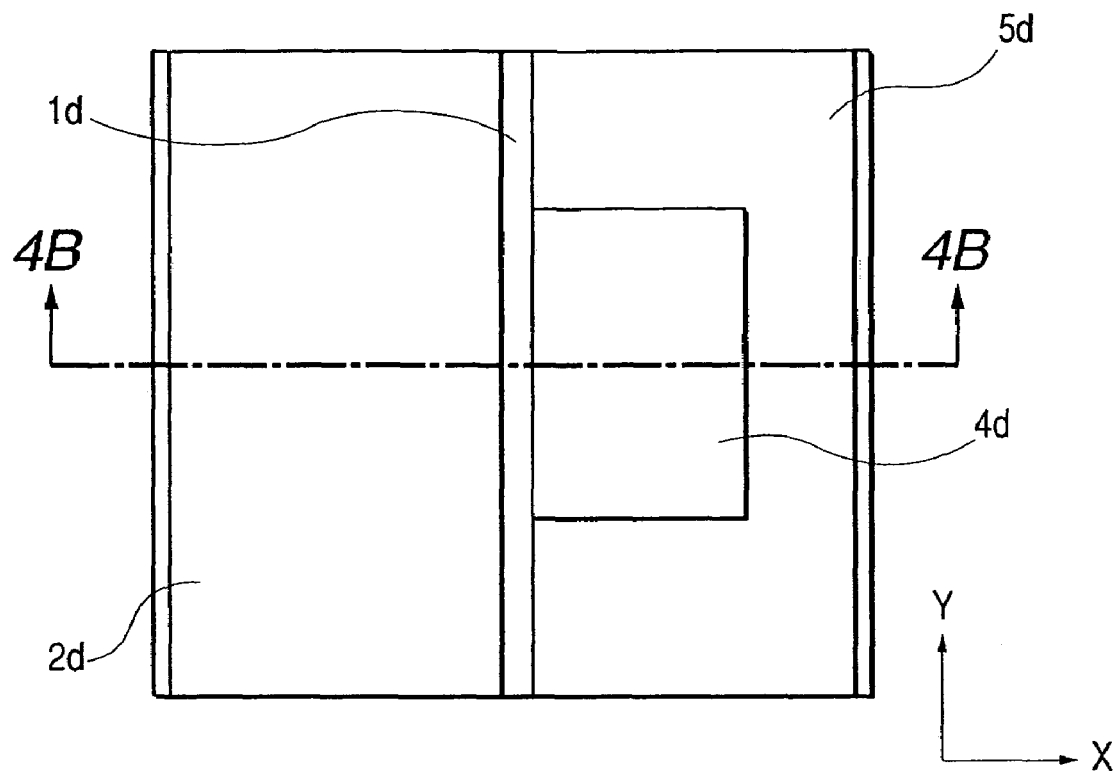
FIGS. 4A and 4B are schematic structural diagrams showing an electron-emitting device according to Example 4 of the present invention.
Figure 4B:
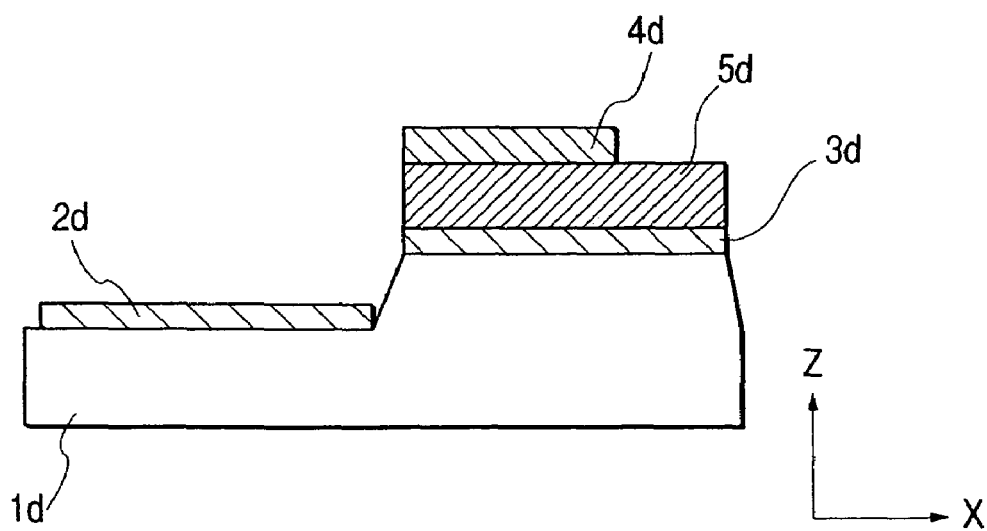

FIGS. 4A and 4B show Example 4.

In the present example, Steps 1 and 2 of Example 1 were changed as follows.

(Step 1)

A quartz substrate is used as the substrate 1. After sufficient cleaning, Ti having a thickness of 5 nm and Pt having a thickness of 30 nm are evaporated continuously as a cathode electrode 3d by sputtering scheme, and Ti having a thickness of 100 nm is continuously evaporated as a layer 5d being capable of growing fibrous carbon.

Next, in a photolithography process, a resist pattern is formed using a positive photoresist (AZ1500/manufactured by Clariant International Ltd.).

Next, dry etching is performed on the Ti layer (layer 5d) using $CF_4$ with the patterned photoresist serving as a mask, and then, dry etching is performed on the Pt and Ti layers (cathode electrode 3d) by using Ar to form the cathode electrode 3d.

Subsequently, with the cathode electrode 3d serving as a mask, etching is performed on a quartz substrate at a depth of about 500 nm by using mixed acid composed of hydrogen fluoride and ammonium fluoride.

And then, Ti having a thickness of 5 nm and Pt having a thickness of 30 nm are evaporated continuously as the extracting electrode 2d by sputtering scheme again. After a photoresist of the cathode electrode 3d is exfoliated, a resist pattern for forming the lead electrode pattern by using a positive photoresist (AZ1500/manufactured by Clariant International Ltd.) again.

Then, dry etching is performed on the Pt layer and Ti layer using Ar gas with the patterned photoresist serving as a mask to form the extracting electrode 2 so as to allow the step formed between the electrodes to serve as a gap.

The steps thereafter are substantially the same as those of Example 1.

However, in the present example, Ni was used as a catalyst material for growing fibrous carbon. At this moment, the resist pattern is formed on the conductive layer 5d, and Ni particles are formed with a thickness of about 5 nm by resistance heating evaporation having good linearlity. And then, oxidization is preferably performed at 350° C. for 30 minutes.

In the present example, since the substrate 1d had a step height to make a height difference between the electrodes, it was possible to form a finer gap and to emit electrons from about 6 V.

Further, because the electrode material 4d was high (large thickness), electrons can be emitted from an intermediate point as well as an upper part of the film. Hence, it was possible to prevent electrons from colliding with the extracting electrode 2d to reduce efficiency and increase a beam diameter.

Example 5

Figure 10:
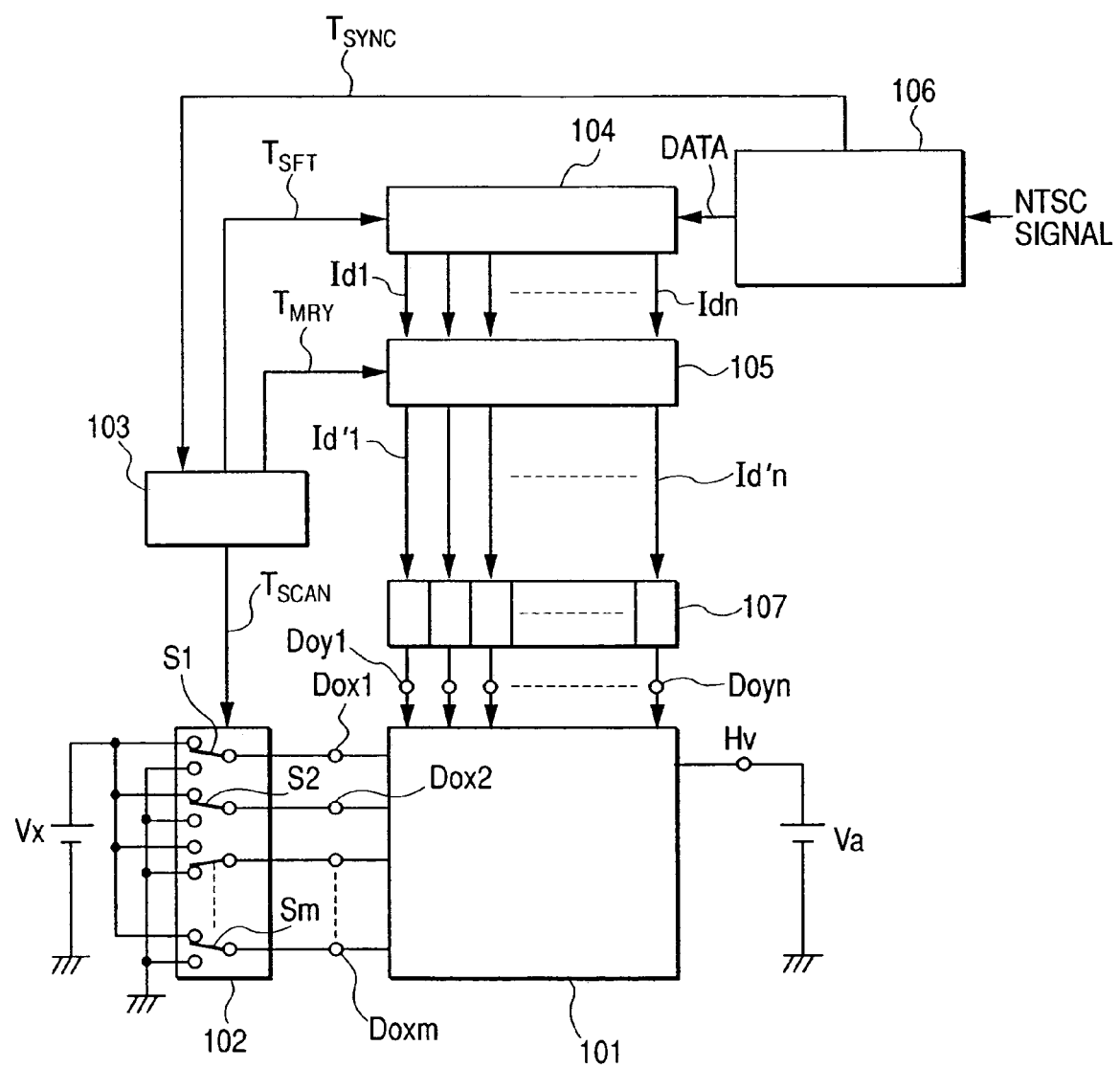
FIG. 10 is a schematic structural diagram showing a circuit configuration of the image-forming apparatus according to an example of the present invention.

Referring to FIGS. 8, 9, and 10, the following will discuss an image-forming apparatus in which a plurality of electron-emitting devices is arranged according to an embodiment of the present invention. In FIG. 8, reference numeral 81 denotes an electron source substrate, reference numeral 82 denotes X-direction wiring, and reference numeral 83 denotes Y-direction wiring. Reference numeral 84 denotes electron-emitting devices and reference numeral 85 denotes connection.

When a capacity of the device increases because a plurality of the electron-emitting devices 84 is provided, in matrix wiring of FIG. 8, even if a short pulse is applied due to pulse width modulation, a capacity component forms bluntness on a waveform and desired gradation cannot be obtained. Therefore, the present example adopts a configuration in which an interlayer insulating layer is disposed directly beside an electron-emitting member to suppress an increase in capacitivity on a part other than the electron-emitting member.

In FIG. 8, the X-direction wiring 82 is composed of m wires of Dx1, Dx2, . . . , and Dxm and is made of an aluminum wiring material with a thickness of about 1 μm and a width of 300 μm by a scheme such as evaporation. A material, a thickness, and a width of wiring are set as appropriate.

The Y-direction wiring 83 is composed of n wires of Dy1, Dy2, . . . , and Dyn having a thickness of 0.5 μm and a width of 100 μm which are formed in the same manner as the X-direction wiring 82.

Between the X-direction wiring 82 having m wires and the Y-direction wiring 83 having n wires, an interlayer insulting film (not shown) is provided to electrically insulate the wiring (m and n are both positive integers).

The interlayer insulating film (not shown) is made of a material such as $SiO_2$, which is formed with a thickness of about 0.8 μm by a scheme such as sputtering scheme. The interlayer insulating film is formed entirely or partially on the electron source substrate 81 having the X-direction wiring 82 formed thereon with a predetermined pattern. Particularly a film thickness is determined to be resistant to a potential difference on the intersection of the X-direction wiring 82 and the Y-direction wiring 83. In the present example, a thickness of the interlayer insulating film is determined such that each device has a device capacity of 1 pF or lower and a device resistance of 30 V.

The X-direction wiring 82 and the Y-direction wiring 83 are each drawn as external terminals.

A pair of electrodes (not shown) constituting the electron-emitting device 84 is electrically connected to the m wires of the X-direction wiring 82 and the n wires of the Y-direction wiring 83 via the connection 85 made of a material such as conductive metal.

Scanning signal applying means (not shown), which applies a scanning signal for selecting a row of the electron-emitting devices 84 arranged in X direction, is connected to X-direction wiring 82. Meanwhile, modulating signal generating means (not shown) for modulating each column of electron-emitting devices 84 in response to an input signal is connected to the Y-direction wiring 83. A driving voltage applied to each of the electron-emitting devices is supplied as a difference voltage between a scanning signal and a modulating signal. The difference voltage is applied to the device.

In the present example, connection is made such that the Y-direction wiring 83 has a high potential and the X-direction wiring 82 has a low potential. Such connection achieves the converging effect of beam.

In the above configuration, with passive matrix wiring, it is possible to select each of the devices and drive them in isolation from each other.

Referring to FIG. 9, the following will discuss an image-forming apparatus constituted by an electron source using a passive-matrix electron source.

FIG. 9 is a schematic perspective view showing a display panel of the image-forming apparatus using soda lime glass as a glass substrate material.

In FIG. 9, reference numeral 81 denotes an electron source substrate, reference numeral 91 denotes a rear plate on which the electron source substrate 81 is fixed, reference numeral 96 denotes a face plate having a fluorescent film 94, a metal back 95, and so on formed on an inner surface of a glass substrate 93. Reference numeral 92 denotes a support frame having the rear plate 91 and the face plate 96 connected thereto by using frit glass and the like. Reference numeral 97 denotes a surrounding member which is sealed by firing for 10 minutes or more at a temperature range of 450° C. in a vacuum.

As described above, the surrounding member 97 is composed of the face plate 96, the support frame 92, and the rear plate 91. Further, it is possible to form the surrounding member 97 with sufficient strength to an air pressure by providing a support (not shown) referred to as a spacer between the face plate 96 and the rear plate 91.

The metal back 95 is formed as follows: after the fluorescent film 94 is produced, a smoothing operation (normally referred to as "filming") is performed on an inner surface of the fluorescent film 94, and then, Al is deposited by a scheme such as vacuum evaporation.

The face plate 96 has a transparent electrode (not shown) on the exterior of the fluorescent film 94 to further increase conductivity of the fluorescent film 94.

When the above sealing is made, the phosphors and the electron-emitting devices need to correspond to each other in the case of a color display, and sufficient positioning is necessary.

In the present example, since electrons from the electron source are emitted to the gate electrode, when an anode voltage is 10 kV and a distance between anodes is 2 mm, the phosphors are shifted to the gate only by 200 μm.

FIG. 10 is a schematic diagram showing a circuit configuration of the image-forming apparatus of the present example.

A scanning circuit 102 has M switching elements (schematically indicated by S1 to Sm in FIG. 10) therein. The switching elements each select an output voltage of a DC voltage source Vx or 0 V (ground level) and are electrically connected to terminals Dox1 to Doxm of a display panel 101.

The switching elements S1 to Sm are operated in response to a control signal $T_{SCAN}$, which is outputted by a control circuit 103. For example, a switching element such as an FET is combined to constitute the switching elements.

The DC voltage source Vx is set to output a constant voltage such that a driving voltage applied to a device not being scanned is at or lower than a electron-emitting threshold voltage, based on the characteristics (electron-emitting threshold voltage) of the electron-emitting device.

The control circuit 103 has the function of matching the operations of the members so as to provide suitable display in response to an image signal inputted from the outside. The control circuit 103 produces control signals $T_{SCAN}$, $T_{SFT}$ and $T_{MRY}$ for each of the members based on the synchronization signal $T_{SYNC}$ transmitted from the synchronization signal separating circuit 106.

A synchronization signal separating circuit 106 is provided for separating a synchronization signal component and a luminance signal component from a television signal of NTSC scheme that is inputted from the outside, and the synchronization signal separating circuit 106 is composed of a typical frequency separating (filter) circuit and so on. A synchronization signal separated by the synchronization separating circuit 106 includes a vertical synchronization signal and a horizontal synchronization signal and is indicated by $T_{SYNC}$ signal for convenience of explanation. The luminance component of the image that is separated from the television signal is indicated by DATA signal for convenience. The DATA signal is inputted to a shift register 104.

The shift register 104 is provided for carry out serial/parallel conversion on the DATA signal, which is inputted to the serial on the time series, for each line of the image, and the shift register 104 is operated in response to a control signal TSFT transmitted from the control circuit 103 (namely, the control signal TSFT also serves as a shift clock of the shift resistor 104). Data subjected to serial/parallel conversion for each image line (corresponding to driving data of N electron-emitting devices) is outputted from the shift register 104 as N parallel signals of Id1 to Idn.

The line memory 105 is a memory for storing data for each image line for necessary time and stores the contents of the Id1 to Idn if necessary in response to a control signal $T_{MRY}$ transmitted from the control circuit 103. The stored contents are outputted as Id'1 to Id'n and are inputted to a modulation signal generator 107.

The modulation signal generator 107 is a signal source for suitably carry out driving modulation on the electron-emitting devices according to the image data Id'1 to Id'n. The output signal is applied to the electron-emitting device in the display panel 101 through the terminals Doy1 to Doyn.

As described above, the electron-emitting device according to the embodiment of the present invention has the following fundamental characteristics relative to an emission current Ie.

Namely, emission of electrons has a definite threshold voltage Vth. Electrons are emitted only when a voltage at Vth or higher is applied. As for a voltage at an electron-emitting threshold value or higher, an emitting voltage varies according to a change in voltage applied to the device.

Therefore, when a pulse voltage is applied to the device, for example, even when a voltage at or lower than an electron-emitting threshold value is applied, electrons are not emitted. However, when a voltage at or higher than an electron-emitting threshold value, electron beam is outputted.

At this moment, it is possible to control the intensity of electron beam by changing a peak value Vm of pulse. Further, it is possible to control a total amount of charge of electron beam, which is outputted by changing a pulse width Pw.

Accordingly, a voltage modulating scheme, a pulse width modulating scheme, and so on are applicable as a scheme for modulating the electron-emitting device.

When the voltage modulating scheme is carried out, as the modulation signal generator 107, it is possible to adopt a circuit of the voltage modulating scheme that generates a voltage pulse with a fixed length and modulates a peak value of pulse in response to inputted data.

When the pulse width modulating scheme is carried out, as the modulation signal generator 107, it is possible to adopt a circuit of the pulse width modulating scheme that generates a voltage pulse with a fixed peak value and modulates a pulse width in response to inputted data.

Digital signal scheme is used for the shift register 104 and the line memory 105.

In the present example, a circuit such as a D/A conversion circuit is used for the modulation signal generator 107, and an amplifying circuit is additionally provided if necessary. In the case of the pulse width modulating scheme, as for the modulation signal generator 107, a circuit is used in which a counter and a comparator are combined with each other. The counter is provided for counting the number of waves outputted from a high-speed oscillator and an oscillator, and the comparator is provided for comparing an output value of the counter and an output value of the memory.

The above-mentioned configuration of the image-forming apparatus is an example of the image-forming apparatus in which the present invention is applicable. A variety of variations are allowed based on the technical idea of the present invention. Although the NTSC system was described for an input signal, an input signal is not limited to the NTSC system. It is possible to adopt PAL, SCAM, and a TV signal (e.g., a high-definition TV such as MUSE system) system using a larger number of scanning lines.

As described above, the present invention is provided with a conductive layer for growth selectivity of fibrous carbon. It was possible to make electrical connection with stability by growing fibrous carbon at a predetermined position with a high density, to reduce a device capacity and a driving voltage and improve the efficiency of emitting electrons, and to achieve a high-resolution beam.

What is claimed is:

1. An electron-emitting device comprising:
   (A) a fiber comprising carbon; and
   (B) a layer made of a metal-oxide semiconductor, wherein the metal-oxide is selected from the group consisting of titanium oxide, zirconium oxide, and niobium oxide, wherein the fiber is electrically connected with the layer.

2. The electron-emitting device according to claim 1, wherein the fiber partially contains a catalyst.

3. The electron-emitting device according to claim 2, wherein the catalyst is selected from the group consisting of Pd, Ni, Fe, Co, and an alloy of these.

4. The electron-emitting device according to claim 3, wherein the catalyst is located at a position between the fiber and the layer.

5. The electron-emitting device according to claim 1, wherein the fiber includes a plurality of graphenes.

6. The electron-emitting device according to claim 5, wherein the plurality of graphenes are stacked along an axis of the fiber.

7. The electron-emitting device according to claim 5, wherein the plurality of graphenes are stacked in an axial direction of the fiber.

8. The electron-emitting device according to claim 1, further comprising:
   a first electrode disposed on a surface of a substrate;
   a second electrode disposed on the surface of the substrate and spaced apart from the first electrode; and
   means for applying a potential higher than a potential to be applied to the first electrode, to the second electrode, wherein at least a part of the layer is disposed on the first electrode.

9. The electron-emitting device according to claim 8, wherein the first electrode is larger in thickness than the second electrode.

10. The electron-emitting device according to claim 8, wherein the fiber is disposed farther than the second electrode from the surface of the substrate.

11. The electron-emitting device according to claim 8, wherein the surface of the substrate has a step height such that the first electrode is higher than the second electrode.

12. An electron source comprising a plurality of electron-emitting devices, wherein each electron-emitting device is an electron emitting device according to claim 1.

13. An image-forming apparatus comprising:
   an electron source; and
   a light emitting member which emits light by irradiation of electrons emitted from the electron source, wherein the electron source is an electron source according to claim 12.

14. An electron-emitting device comprising:
   (A) a plurality of fibers each comprising carbon; and
   (B) a layer made of a metal-oxide semiconductor, wherein the metal-oxide is selected from the group consisting of titanium oxide, zirconium oxide, and niobium oxide, wherein the fibers are electrically connected with the layer.

15. The electron-emitting device according to claim 14, further comprising:
   a first electrode disposed on a surface of a substrate;
   a second electrode disposed on the surface of the substrate and spaced apart from the first electrode; and
   means for applying a potential higher than a potential to be applied to the first electrode, to the second electrode, wherein at least a part of the layer is disposed on the first electrode.

16. An electron source comprising a plurality of electron-emitting devices, wherein each electron-emitting device is an electron emitting device according to claim 14.

17. An image-forming apparatus comprising:
   an electron source; and
   a light emitting member which emits light by irradiation of electrons emitted from the electron source, wherein the electron source is an electron source according to claim 16.

18. An electron-emitting device comprising:
   (A) a plurality of fibers each comprising carbon; and
   (B) a layer made of a metal-oxide semiconductor, wherein the metal-oxide is selected from the group consisting of titanium oxide, zirconium oxide, and niobium oxide, wherein the fibers are electrically connected with the layer without a tunnel junction.

19. An electron source comprising a plurality of electron-emitting devices, wherein each electron-emitting device is an electron emitting device according to claim 18.

20. An image-forming apparatus comprising:
   an electron source; and
   a light emitting member which emits light by irradiation of electrons emitted from the electron source, wherein the electron source is an electron source according to claim 19.

* * * * *

UNITED STATES PATENT AND TRADEMARK OFFICE
CERTIFICATE OF CORRECTION

| | | |
|---|---|---|
| PATENT NO. | : 7,276,842 B2 | |
| APPLICATION NO. | : 11/286436 | |
| DATED | : October 2, 2007 | |
| INVENTOR(S) | : Takeo Tsukamoto | |

It is certified that error appears in the above-identified patent and that said Letters Patent is hereby corrected as shown below:

ON THE TITLE PAGE ITEM [54]:

Title, "ELECTRON EMITTING" should read --ELECTRON-EMITTING--.

ON THE TITLE PAGE ITEM [56] REFERENCES CITED:

U.S. Patent Documents:
"2002/0074947 A1 6/2002 Tsuukamoto" should read
--2002/0074947 A1 6/2002 Tsukamoto--.

Foreign Patent Documents:
"JP 08-115652 5/1996" (second occurrence) should be deleted;
"EP 913508 A2 5/1999" should read --EP 0 913 508 A2 5/1999--;
"EP A1 443 865 8/1991" should read --EP 0 443 865 A1 8/1991--;
"EP A1 936 650 8/1999" should be deleted; and
"EP A1 871 195 10/1998" should read --EP 0 871 195 A1 10/1998--.

Other Publications:
After "T. Guo et al.,": "Single-Walled" should read --Single-Walled-- and "Chem" should read --Chem.--;
After "R.T.K. Baker et al.": "Formation . . .: "Acyetylene,"" should read --Acetylene,"--;
After "A.C. Dillon et al.,": "Single- Walled" should read --Single-Walled--;
After "Hisashi Araki et al.,": "Films," should read --Films",--;
"W. Zhu Et Al.," should read --W. Zhu et al.,--;
"J.M. Bonard Et Al.," should read --J. M. Bonard et al.,--;
"A.M. Rao et al.,": "of" should be deleted and "Letter," should read --Letters,--.

UNITED STATES PATENT AND TRADEMARK OFFICE
CERTIFICATE OF CORRECTION

PATENT NO. : 7,276,842 B2
APPLICATION NO. : 11/286436
DATED : October 2, 2007
INVENTOR(S) : Takeo Tsukamoto It is certified that error appears in the above-identified patent and that said Letters Patent is hereby corrected as shown below:

COLUMN 1:

Line 5, "ELECTRON EMITTING" should read --ELECTRON-EMITTING--;
Line 36, "an" (second occurrence) should read --a--;
Line 39, "an" should read --a--;
Line 40, "spint" should read --Spindt--;
Line 42, "Phys., 47,5248" should read --Phys., 47, 5248--; and
Line 43, "(1967)" should read --(1976)--.

COLUMN 2:

Line 23, "spint" should read --Spindt--;
Line 26, "spint" should read --Spindt--;
Line 35, "spint-type" should read --Spindt-type--;
Line 43, "an" should read --a--; and
Line 63, "comprising" should read --comprise--.

COLUMN 4:

Line 24, "And" should read --and--; and
Line 63, " $\sqrt{\sqrt{(Vf/Va)}}$ " should read -- $\sqrt{(Vf/Va)}$ --.

COLUMN 5:

Line 1, "above-configuration," should read --above configuration,--; and
Line 15, "spint" should read --Spindt--.

COLUMN 6:

Line 23, "its" should be deleted;
Line 28, "and" should read --and vertical--;
Line 44, "50-time" should read --50 times--; and
Line 58, "fields" should read --field--.

COLUMN 7:

Line 15, "gate, 4) a" should read --gate, and 4) an--; and
Line 32, "a" should read --an--.

UNITED STATES PATENT AND TRADEMARK OFFICE
CERTIFICATE OF CORRECTION

PATENT NO.        : 7,276,842 B2
APPLICATION NO.   : 11/286436
DATED             : October 2, 2007
INVENTOR(S)       : Takeo Tsukamoto It is certified that error appears in the above-identified patent and that said Letters Patent is hereby corrected as shown below:

COLUMN 9:

Line 48, "drawing," should read --drawings,--.

COLUMN 10:

Line 1, "substances" should read --substance--;
Line 2, "arranged" should read --arranged--; and
Line 12, "bouds" should read --bonds--.

COLUMN 11:

Line 31, "thereof although" should read --thereof,--.

COLUMN 12:

Line 34, "numeral" should read --numeral 85--; and
Line 35, "X-direct ion" should read --X-direction--.

COLUMN 13:

Line 3, "shares" should read --share--.

COLUMN 16:

Line 53, "a" should read --an--.

COLUMN 17:

Line 37, "linearlity." should read --linearity.--.

UNITED STATES PATENT AND TRADEMARK OFFICE
CERTIFICATE OF CORRECTION

PATENT NO. : 7,276,842 B2
APPLICATION NO. : 11/286436
DATED : October 2, 2007
INVENTOR(S) : Takeo Tsukamoto It is certified that error appears in the above-identified patent and that said Letters Patent is hereby corrected as shown below:

<u>COLUMN 20</u>:

Line 5, "resistor" should read --register--;
    Line 16, "carry" should read --carrying--; and
    Line 33, "value," should read --value is applied,--.

<u>COLUMN 22</u>:

Line 1, "electron emit-" should read --electron-emit---;
    Line 28, "electron emit-" should read --electron-emit- --; and
    Line 46, "electron emit-" should read --electron-emit- --.

Signed and Sealed this

Twenty-fifth Day of March, 2008

JON W. DUDAS
*Director of the United States Patent and Trademark Office*